US011638043B2

(12) United States Patent
Zhang et al.

(10) Patent No.: US 11,638,043 B2
(45) Date of Patent: Apr. 25, 2023

(54) METHOD FOR ESTABLISHING CO-HOSTING IN LIVE-STREAMING, AND TERMINAL

(71) Applicant: BEIJING DAJIA INTERNET INFORMATION TECHNOLOGY CO., LTD., Beijing (CN)

(72) Inventors: Xinyu Zhang, Beijing (CN); Chun Chen, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/573,968

(22) Filed: Jan. 12, 2022

(65) Prior Publication Data

US 2022/0329877 A1 Oct. 13, 2022

(30) Foreign Application Priority Data

Apr. 13, 2021 (CN) .......................... 202110397111.0

(51) Int. Cl.
- *G06F 3/048* (2013.01)
- *H04N 21/2187* (2011.01)
- *G06F 3/0482* (2013.01)
- *G06F 3/04842* (2022.01)

(52) U.S. Cl.
CPC ....... *H04N 21/2187* (2013.01); *G06F 3/0482* (2013.01); *G06F 3/04842* (2013.01)

(58) Field of Classification Search
CPC .............. G06F 3/0482; G06F 3/04842; H04N 21/2187; H04N 21/2393; H04N 21/4788;
(Continued)

(56) References Cited

U.S. PATENT DOCUMENTS

| 11,082,467 B1 * | 8/2021 | Hartnett | H04N 21/437 |
| 2008/0229215 A1 * | 9/2008 | Baron | G06N 3/006 715/751 |

(Continued)

FOREIGN PATENT DOCUMENTS

| CN | 107665614 A | 2/2018 |
| CN | 109587509 A | 4/2019 |

(Continued)

OTHER PUBLICATIONS

The State Intellectual Property Office of People's Republic of China, First Office Action in Patent Application No. CN202110397111.0 dated Jun. 8, 2022, which is a foreign counterpart application corresponding to this U.S Patent Application, which is foreign counterpart application of this US application.

(Continued)

*Primary Examiner* — Mahelet Shiberou
(74) *Attorney, Agent, or Firm* — Kolitch Romano Dascenzo Gates LLC

(57) ABSTRACT

A method for establishing co-hosting in live-streaming is disclosed. The method includes: displaying a co-host mode setting portal in a live-streaming room of a first user account; displaying a first co-host mode, a second co-host mode, a third co-host mode in response to a trigger operation on the co-host mode setting portal, and the second user account is a viewer account in the live-streaming room; and determining a selected co-host mode as a target co-host mode for the live-streaming room in response to a select operation on any one of the first co-host mode, the second co-host mode, and the third co-host mode.

19 Claims, 16 Drawing Sheets

(58) Field of Classification Search
CPC ........... H04N 21/2542; H04N 21/1488; H04N 21/47815; H04N 21/25866; H04N 21/4363; H04N 21/4751
See application file for complete search history.

(56) References Cited

U.S. PATENT DOCUMENTS

| | | | |
|---|---|---|---|
| 2015/0304605 A1 | 10/2015 | Hartman et al. | |
| 2016/0134570 A1* | 5/2016 | Yin | H04L 65/403 709/204 |
| 2018/0041551 A1* | 2/2018 | Ormseth | H04L 12/1822 |
| 2020/0351562 A1 | 11/2020 | Siddique et al. | |
| 2022/0141500 A1 | 5/2022 | Du | |

FOREIGN PATENT DOCUMENTS

| | | |
|---|---|---|
| CN | 109618191 A | 4/2019 |
| CN | 110324655 A | 10/2019 |
| CN | 110933481 A | 3/2020 |
| CN | 112291583 A | 1/2021 |
| CN | 112423002 A | 2/2021 |
| CN | 112468831 A | 3/2021 |

OTHER PUBLICATIONS

Extended European Search Report Communication Pursuant to Rule 62 EPC, dated Sep. 20, 2022 in Patent Application No. EP 22152091.9, which is a foreign counterpart application to which this application claims priority.

The State Intellectual Property Office of People's Republic of China, Second Office Action in Patent Application No. CN202110397111.0 dated Nov. 9, 2022, which is a foreign counterpart application corresponding to this U.S. Patent Application, to which this application claims priority.

Anonymous, Multiple Hosts—Agora Documentation, obtained at https://docs.agora.io/en/Multiple%20Hosts/co_host_overview?platform=All%20Platforms; Nov. 16, 2020, entire document.

* cited by examiner

Providing, by a server, a co-host mode setting portal in a live-streaming room of a first user account, wherein the co-host mode setting portal is configured to display a first co-host mode, a second co-host mode, and a third co-host mode in response to being triggered, and wherein the first user account initiates a co-host invitation to the live-streaming room in the first co-host mode, at least one second user account autonomously establishes co-hosting in the second co-host mode, the second user account requests co-hosting in the live-streaming room in the third co-host mode, and the second user account is a viewer account in the live-streaming room ⟶ 301

Determining, by a server, a selected co-host mode as a target co-host mode for the live-streaming room in response to the first user account selecting any one of the first co-host mode, the second co-host mode and the third co-host mode ⟶ 302

FIG. 3

METHOD FOR ESTABLISHING CO-HOSTING IN LIVE-STREAMING, AND TERMINAL

This application is based on and claims priority to Chinese Patent Application No. 202110397111.0, filed on Apr. 13, 2021, the disclosure of which is herein incorporated by reference in its entirety.

TECHNICAL FIELD

The present disclosure relates to the field of computer technologies, in particular to a method for establishing co-hosting in live-streaming, and a terminal.

BACKGROUND

The development of computer technologies has expanded the types and uses of live-streaming. A user may communicate with others on the Internet by initiating a voice or video co-hosting in live-streaming.

SUMMARY

The present disclosure provides a method for establishing co-hosting in live-streaming and a terminal. The technical solutions of the present disclosure are as follows.

In one aspect, a method for establishing co-hosting in live-streaming is provided. The method is performed by a terminal and includes:

displaying a co-host mode setting portal in a live-streaming room of a first user account;

displaying a first co-host mode, a second co-host mode, and a third co-host mode in response to a trigger operation on the co-host mode setting portal, wherein the first user account initiates a co-host invitation to the live-streaming room in the first co-host mode, at least one second user account autonomously establishes co-hosting in the live-streaming room in the second co-host mode, the second user account requests co-hosting in the live-streaming room in the third co-host mode, and the second user account is a viewer account in the live-streaming room; and determining a selected co-host mode as a target co-host mode for the live-streaming room in response to a select operation on any one of the first co-host mode, the second co-host mode, and the third co-host mode.

In another aspect, a method for establishing co-hosting in live-streaming is provided. The method is performed by a server and includes:

providing a co-host mode setting portal in a live-streaming room of a first user account, wherein the co-host mode setting portal is configured to display a first co-host mode, a second co-host mode, and a third co-host mode in response to being triggered, and wherein the first user account initiates a co-host invitation to the live-streaming room in the first co-host mode, at least one second user account autonomously establishes co-hosting in the live-streaming room in the second co-host mode, the second user account requests for co-hosting in the live-streaming room in the third co-host mode, and the second user account is a viewer account in the live-streaming room; and determining a selected co-host mode as a target co-host mode for the live-streaming room in response to the first user account selecting any one of the first co-host mode, the second co-host mode and the third co-host mode.

In still another aspect, an apparatus for establishing co-hosting in live-streaming is provided. The apparatus includes:

a portal displaying unit, configured to display a co-host mode setting portal in a live-streaming room of a first user account;

a mode displaying unit, configured to display a first co-host mode, a second co-host mode, and a third co-host mode in response to a trigger operation on the co-host mode setting portal, wherein the first user account initiates a co-host invitation to the live-streaming room in the first co-host mode, at least one second user account autonomously establishes co-hosting in the live-streaming room in the second co-host mode, the second user account requests co-hosting in the live-streaming room in the third co-host mode, and the second user account is a viewer account in the live-streaming room; and a determining unit, configured to determine a selected co-host mode as a target co-host mode for the live-streaming room in response to a select operation on any one of the first co-host mode, the second co-host mode and the third co-host mode.

In still another aspect, an apparatus for establishing co-hosting in live-streaming is provided. The apparatus includes:

a providing unit, configured to provide a co-host mode setting portal in a live-streaming room of a first user account, wherein the co-host mode setting portal is configured to display a first co-host mode, a second co-host mode, and a third co-host mode in response to being triggered, and wherein the first user account initiates a co-host invitation to the live-streaming room in the first co-host mode, at least one second user account autonomously establishes co-hosting in the live-streaming room in the second co-host mode, the second user account requests for co-hosting in the live-streaming room in the third co-host mode, and the second user account is a viewer account in the live-streaming room; and a determining unit, configured to determine a selected co-host mode as a target co-host mode for the live-streaming room in response to the first user account selecting any one of the first co-host mode, the second co-host mode and the third co-host mode.

In still another aspect, a terminal is provided. The terminal includes:

one or more processors; and a memory configured to store one or more program codes executable by the processor;

wherein the one or more processors, when running the one or more program codes, are caused to execute instructions for:

displaying a co-host mode setting portal in a live-streaming room of a first user account;

displaying a first co-host mode, a second co-host mode, and a third co-host mode in response to a trigger operation on the co-host mode setting portal, wherein the first user account initiates a co-host invitation to the live-streaming room in the first co-host mode, at least one second user account autonomously establishes co-hosting in the second co-host mode, the second user account requests co-hosting in the live-streaming room in the third co-host mode, the second user account is a viewer account in the live-streaming room, and the second user account is a viewer account in the live-streaming room; and determining a selected co-host mode as a target co-host mode for the live-streaming room in response to a select operation on any one of the first co-host mode, the second co-host mode, and the third co-host.

In still another aspect, a server is provided. The server includes:
one or more processors; and
a memory configured to store one or more program codes executable by the one or more processors;
wherein the one or more processors, when running the one or more program codes, are caused to execute instructions for:
providing a co-host mode setting portal in a live-streaming room of a first user account, wherein the co-host mode setting portal is configured to display a first co-host mode, a second co-host mode, and a third co-host mode in response to being triggered, and wherein the first user account initiates a co-host invitation to the live-streaming room in the first co-host mode, at least one second user account autonomously establishes co-hosting in the live-streaming room in the second co-host mode, the second user account requests for co-hosting in the live-streaming room in the third co-host mode, and the second user account is a viewer account in the live-streaming room; and
determining a selected co-host mode as a target co-host mode for the live-streaming room in response to the first user account selecting any one of the first co-host mode, the second co-host mode and the third co-host mode.

In still another aspect, a computer-readable storage medium storing one or more program codes therein is provided. The one or more program codes, when run by a processor of a terminal, cause the terminal to execute instructions for:
displaying a co-host mode setting portal in a live-streaming room of a first user account;
displaying a first co-host mode, a second co-host mode, and a third co-host mode in response to a trigger operation on the co-host mode setting portal, wherein the first user account initiates a co-host invitation to the live-streaming room in the first co-host mode, at least one second user account autonomously establishes co-hosting in the live-streaming room in the second co-host mode, the second user account requests co-hosting in the live-streaming room in the third co-host mode, and the second user account is a viewer account in the live-streaming room;
determining a selected co-host mode as a target co-host mode for the live-streaming room in response to a select operation on any one of the first co-host mode, the second co-host mode, and the third co-host mode.

The one or more program codes, when run by a processor of a server, cause the server to execute instructions for:
providing a co-host mode setting portal in a live-streaming room of a first user account, wherein the co-host mode setting portal is configured to display a first co-host mode, a second co-host mode, and a third co-host mode in response to being triggered, and wherein the first user account initiates a co-host invitation to the live-streaming room in the first co-host mode, at least one second user account autonomously establishes co-hosting in the live-streaming room in the second co-host mode, the second user account requests for co-hosting in the live-streaming room in the third co-host mode, and the second user account is a viewer account in the live-streaming room; and
determining a selected co-host mode as a target co-host mode for the live-streaming room in response to the first user account selecting any one of the first co-host mode, the second co-host mode and the third co-host mode.

In still another aspect, a computer program product is provided. The computer program product includes a computer program, wherein the computer program, when run by a processor, causes a terminal to execute instructions for:
displaying a co-host mode setting portal in a live-streaming room of a first user account;
displaying a first co-host mode, a second co-host mode, and a third co-host mode in response to a trigger operation on the co-host mode setting portal, wherein the first user account initiates a co-host invitation to the live-streaming room in the first co-host mode, at least one second user account autonomously establishes co-hosting in the live-streaming room in the second co-host mode, the second user account requests co-hosting in the live-streaming room in the third co-host mode, and the second user account is a viewer account in the live-streaming room; and
determining a selected co-host mode as a target co-host mode for the live-streaming room in response to a select operation on any one of the first co-host mode, the second co-host mode, and the third co-host mode.

Or wherein the computer program, when run by a processor, causes a server to execute instructions for:
providing a co-host mode setting portal in a live-streaming room of a first user account, wherein the co-host mode setting portal is configured to display a first co-host mode, a second co-host mode, and a third co-host mode in response to being triggered, and wherein the first user account initiates a co-host invitation to the live-streaming room in the first co-host mode, at least one second user account autonomously establishes co-hosting in the live-streaming room in the second co-host mode, the second user account requests for co-hosting in the live-streaming room in the third co-host mode, and the second user account is a viewer account in the live-streaming room; and
determining a selected co-host mode as a target co-host mode for the live-streaming room in response to the first user account selecting any one of the first co-host mode, the second co-host mode and the third co-host mode.

BRIEF DESCRIPTION OF THE DRAWINGS

The accompanying drawings, which are incorporated in and constitute part of this description, illustrate embodiments consistent with the present disclosure, serve to explain the principle of the present disclosure together with the description, and do not constitute an improper limitation of the present disclosure.

FIG. 3 is a flowchart of a method for establishing co-hosting in live-streaming according to some embodiments of the present disclosure;

DETAILED DESCRIPTION

To make those skilled in the art understand technical solutions of the present disclosure better, technical solutions in the embodiments of the present disclosure are clearly and completely described in the following with reference to the accompanying drawings.

The data involved in the present disclosure may be the data authorized by the user or fully authorized by all parties.

In the related technology, the method for establishing co-hosting in live-streaming is generally implemented as follows. In the case that a viewer in the live-streaming room wants to co-host with the live streamer or the anchor, the viewer may trigger a co-host control displayed in the live-streaming room, such that the terminal corresponding to the viewer is triggered to send a co-host request to the terminal corresponding to the live streamer. Then, the user may successfully establish co-hosting with the live streamer in response to the live streamer accepting the co-host request, thereby enabling communication between the viewer and the live streamer by voice or video. However, in the aforesaid technology, the live streamer needs to handle the co-host requests of each viewer in sequence, which reduces the efficiency of establishing co-hosting in live-streaming.

Figure 1:
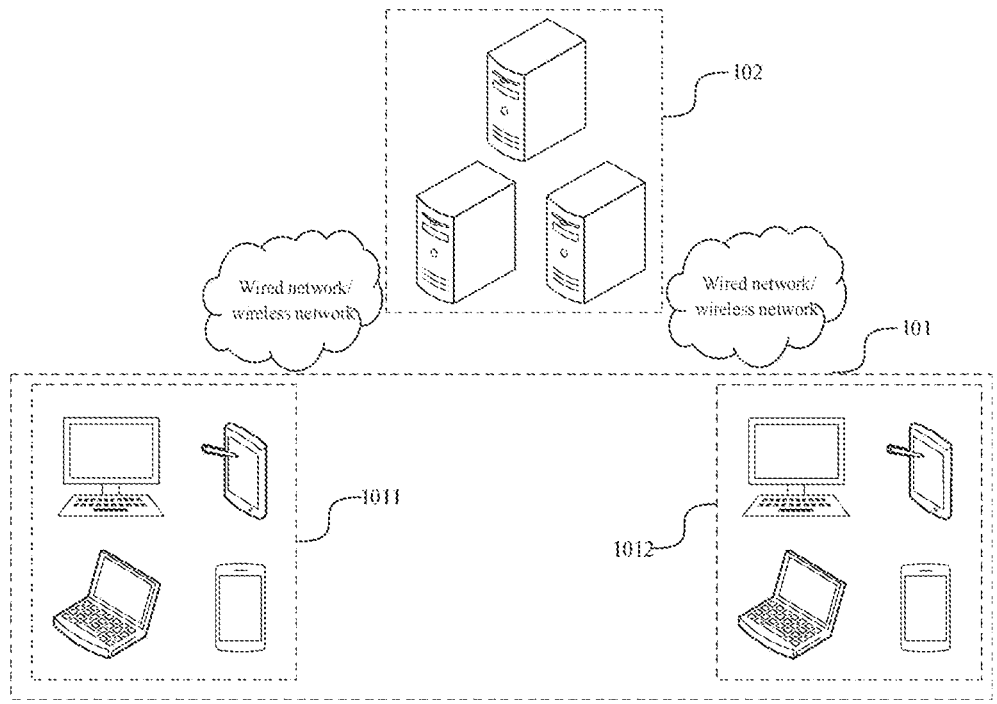
FIG. 1 is an application environment diagram of a method for establishing co-hosting in live-streaming according to some embodiments of the present disclosure.

FIG. 1 is an application environment diagram of a method for establishing co-hosting in live-streaming according to some embodiments of the present disclosure. Referring to FIG. 1, the application environment includes a terminal 101 and a server 102.

The terminal 101 may be at least one of a smartphone, a smartwatch, a desktop computer, a laptop computer, a virtual reality terminal, an augmented reality terminal, a wireless terminal, a lap-top portable computer, and the like. The terminal 101 has a communication function and can access a wired network or a wireless network. The terminal 101 may refer to a terminal among a plurality of terminals, and is merely taken as an example to illustrate this embodiment. Those skilled in the art may know that the number of the above terminals may be more or less. The terminal 101 may run a target application with live-streaming capabilities.

The method for establishing co-hosting in live-streaming according to embodiments of the present disclosure may be applied to a scenario of a live-streaming room. In some embodiments, the live-streaming room is a voice live-streaming room, such as a voice chat room. In other embodiments, the live-streaming room is a video live-streaming room. Accordingly, the co-hosting in live-streaming may be either a voice co-hosting or a video co-hosting. In embodiments of the present disclosure, the terminal 101 includes a first terminal 1011 and a second terminal 1012. The first terminal 1011 corresponds to a first user account in the live-streaming room, and the first user account is a live streamer account. The second terminal 1012 corresponds to any second user account in the live-streaming room, and the second user account is a viewer account.

The server 102 may be an independent physical server, or a server cluster or distributed file system composed of a plurality of physical servers, or a cloud server that provides basic cloud computing services, such as cloud services, cloud database, cloud computing, cloud functions, cloud storage, network services, cloud communications, middleware services, domain name services, security services, content delivery network (CDN), and big data and artificial intelligence platform. The server 102 and the terminal 101 may be connected directly or indirectly by wired or wireless communication, which is not limited by embodiments of the present disclosure. Optionally, there may be more or fewer servers 102, which is not limited in embodiments of the present disclosure. The server 102 may also include other functional servers, so as to provide more comprehensive and diverse services. In embodiments of the present disclosure, the server 102 may be a backend server of a target application having a live-streaming function.

Figure 2:
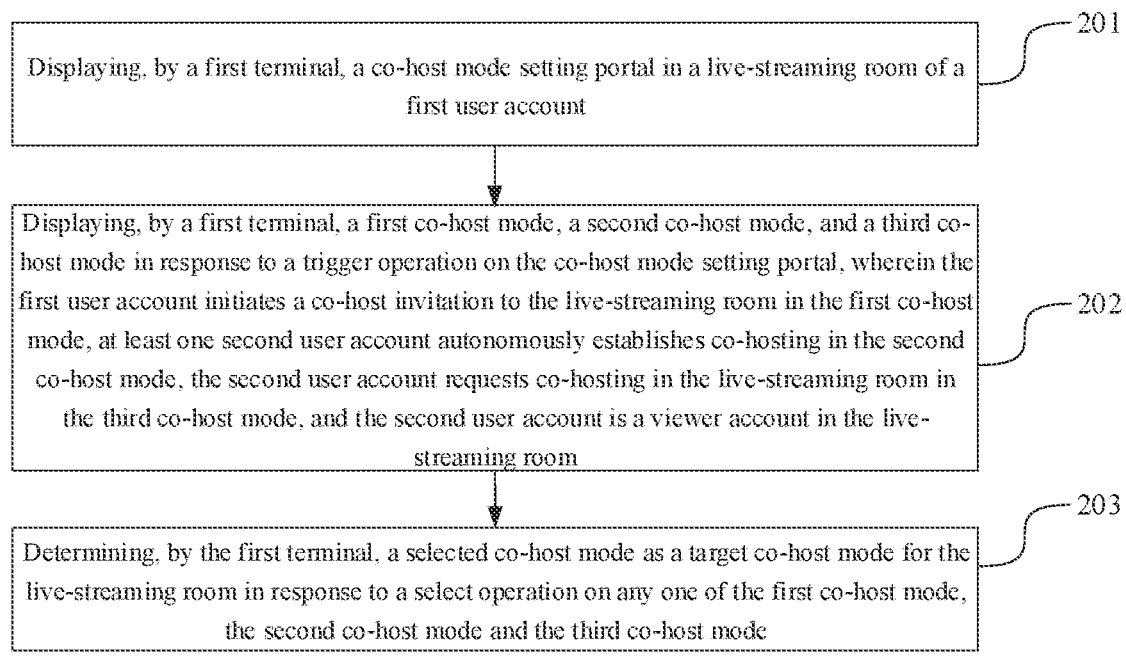
FIG. 2 is a flowchart of a method for establishing co-hosting in live-streaming according to some embodiments of the present disclosure.

FIG. 2 is a schematic flowchart of a method for establishing co-hosting in live-streaming according to some embodiments of the present disclosure. As shown in FIG. 2, the method is performed by a first terminal and includes following processes. The first terminal corresponds to a first user account in the live-streaming room, and the first user account is a live streamer account.

In 201, the first terminal displays a co-host mode setting portal in a live-streaming room of a first user account.

In 202, the first terminal displays a first co-host mode, a second co-host mode, and a third co-host mode in response to a trigger operation on the co-host mode setting portal. The first user account initiates a co-host invitation to the live-streaming room in the first co-host mode, at least one second user account autonomously establishes co-hosting in the live-streaming room in the second co-host mode, the second user account requests co-hosting in the live-streaming room in the third co-host mode, and the second user account is a viewer account in the live-streaming room.

In 203, the first terminal determines a selected co-host mode as a target co-host mode for the live-streaming room in response to a select operation on any one of the first co-host mode, the second co-host mode and the third co-host mode.

In the technical solution according to embodiments of the present disclosure, three co-host modes can be displayed by triggering the co-host mode setting portal, which enriches the co-host modes of the live-streaming room and facilitates the first user to set the co-host modes of the live-streaming room flexibly based on the co-hosting situation in the live-streaming room, such that the efficiency of co-hosting in live-streaming can be improved by switching among the three co-host modes.

In some embodiments, displaying the first co-host mode, the second co-host mode, and the third co-host mode in response to the trigger operation on the co-host mode setting portal includes:

displaying a co-host mode setting panel in response to the trigger operation on the co-host mode setting portal; and displaying the first co-host mode, the second co-host mode, and the third co-host mode in the co-host mode setting panel.

In some embodiments, upon determining the selected co-host mode as the target co-host mode for the live-streaming room in response to the select operation on any one of the first co-host mode, the second co-host mode and the third co-host mode, the method further includes:

displaying a co-host control in the live-streaming room as an inoperable state in a case of the target co-host mode being determined as the first co-host mode. The second user account establishes co-hosting by the co-host control.

In some embodiments, upon determining the selected co-host mode as the target co-host mode for the live-streaming room in response to the select operation on any one of the first co-host mode, the second co-host mode and the third co-host mode, the method further includes:

sending a first co-host request to a server in response to a co-host invitation initiated by the first user account to any second user account in the live-streaming room in a case of the target co-host mode being determined as the first co-host mode. The first co-host request is configured to request co-hosting with the any second user account.

In some embodiments, prior to sending the first co-host request to the server in response to the co-host invitation initiated by the first user account to the any second user account in the live-streaming room, the method further includes:

displaying a plurality of second user accounts not in a co-host state in the live-streaming room in response to a trigger operation on a co-host management portal in the live-streaming room.

In some embodiments, in response to sending the first co-host request to the server in response to the co-host invitation initiated by the first user account to the any second user account in the live-streaming room, the method further includes:

receiving live-streaming data of the any second user account in response to the any second user account accepting the first co-host request.

In some embodiments, in response to sending the first co-host request to the server in response to the co-host invitation initiated by the first user account to the any second user account in the live-streaming room, the method further includes:

displaying a co-host prompt message in the live-streaming room in response to the any second user account rejecting or failing to respond to the first co-host request. The co-host prompt message is configured to prompt the first user account that the any second user account rejects or fails to respond to the first co-host request.

In some embodiments, the live-streaming room includes a plurality of co-host sites, and displaying the co-host mode setting portal in the live-streaming room of the first user account includes:

displaying a first co-host managing panel in response to a trigger operation on a target co-host site, wherein the first co-host managing panel is configured to manage a co-host permission of an account corresponding to the target co-host site, and the target co-host site corresponds to any second user account in a co-host state in the live-streaming room; and displaying the co-host mode setting portal in the first co-host managing panel.

In some embodiments, upon displaying the first co-host managing panel in response to the trigger operation on the target co-host site, the method further includes any one of:

setting the target co-host site to a muted state in response to a trigger operation on a mute control in the first co-host managing panel; and revoking the co-host permission of the account corresponding to the target co-host site in response to a trigger operation on a dismiss control in the first co-host managing panel.

In some embodiments, the live-streaming room includes a live-streaming room setting portal, and displaying the co-host mode setting portal in the live-streaming room of the first user account includes:

displaying a live-streaming room setting panel in response to a trigger operation on the live-streaming room setting portal, wherein the live-streaming room setting panel is configured to set information associated with the live-streaming room; and displaying the co-host mode setting portal in the live-streaming room setting panel.

In some embodiments, the live-streaming room includes a co-host management portal, and displaying the co-host mode setting portal in the live-streaming room of the first user account includes:

displaying a second co-host managing panel in response to a trigger operation on the co-host management portal, wherein the second co-host managing panel is configured to display co-host states of the second user accounts in the live-streaming room; and displaying the co-host mode setting portal in the second co-host managing panel.

In some embodiments, in the case that the target co-host mode is determined as the second co-host mode, upon determining the selected co-host mode as the target co-host mode for the live-streaming room in response to the select operation on any one of the first co-host mode, the second co-host mode and the third co-host mode, the method further includes:

receiving live-streaming data of the any second user account in the live-streaming room in response to the any second user account in the live-streaming room initiating a second co-host request and a co-host vacant site existing in the live-streaming room. The second co-host request is configured to acquire the co-host vacant site which is a co-host site in an idle state.

In some embodiments, in the case that the target co-host mode is determined as the third co-host mode, upon determining the selected co-host mode as the target co-host mode for the live-streaming room in response to the select operation on any one of the first co-host mode, the second co-host mode and the third co-host mode, the method further includes:

receiving a third co-host request from any second user account, wherein the third co-host request is configured to request co-hosting with the first user account; and receiving live-streaming data of the any second user account in response to an accept operation to the third co-host request of the any second user account.

In some embodiments, the method further includes:

displaying, in the live-streaming room, a number of accounts that have submitted a co-host request at a present moment.

In some embodiments, the method further includes:

displaying, in a region where the co-host management portal for the live-streaming room is configured, the number of accounts that have submitted the co-host request at the present moment.

In some embodiments, the method further includes:

displaying a plurality of co-host request messages in the live-streaming room in response to a trigger operation on the co-host management portal. The co-host request message indicates that a corresponding second user account requests co-hosting in the first user account.

In some embodiments, the second user account is an account having co-host permission, and the account having co-host permission is at least one of an account belonging to a same region as the first user account, an account belonging to a target region, an account whose attribute information meets a target condition, an account that already follows the first user account, an account that follows each other with the first user account, or an account that the first user account already follows.

FIG. 3 is a flowchart of a method for establishing co-hosting in live-streaming according to some embodiments of the present disclosure. As shown in FIG. 3, the method is performed by the server and includes following processes.

In 301, the server provides a co-host mode setting portal in a live-streaming room of a first user account. The co-host mode setting portal is configured to display a first co-host mode, a second co-host mode, and a third co-host mode in response to being triggered. The first user account initiates a co-host invitation to the live-streaming room in the first co-host mode, at least one second user account autonomously establishes co-hosting in the live-streaming room in the second co-host mode, the second user account requests for co-hosting in the live-streaming room in the third co-host mode, and the second user account is a viewer account in the live-streaming room.

In 302, the server determines a selected co-host mode as a target co-host mode for the live-streaming room in response to the first user account selecting any one of the first co-host mode, the second co-host mode and the third co-host mode.

In the technical solution according to embodiments of the present disclosure, three co-host modes can be displayed by triggering the co-host mode setting portal, which enriches the co-host modes of the live-streaming room and facilitates the first user to set the co-host mode of the live-streaming room flexibly based on the co-hosting situation in the live-streaming room, such that the efficiency of co-hosting in live-streaming can be improved by switching among the three co-host modes.

In some embodiments, in the case that the target co-host mode is determined as the first co-host mode, upon determining the selected co-host mode as the target co-host mode for the live-streaming room in response to the first user account selecting any one of the first co-host mode, the second co-host mode and the third co-host mode, the method further includes:

receiving a first co-host request from the first user account, wherein the first co-host request is configured to request co-hosting with any second user account in the live-streaming room; and sending the first co-host request to a terminal corresponding to the second user account.

In some embodiments, in response to sending the first co-host request to the terminal corresponding to the second user account, the method further includes:

sending live-streaming data of the second user account to a terminal corresponding to the first user account in response to the second user account accepting the first co-host request.

In some embodiments, in response to sending the first co-host request to the terminal corresponding to the second user account, the method further includes:

sending a co-host prompt message to the terminal corresponding to the first user account in response to the second user account rejecting or failing to respond to the first co-host request. The co-host prompt message is configured to prompt the first user account that the second user account rejects or fails to respond to the first co-host request.

In some embodiments, in a case that the target co-host mode is determined as the second co-host mode, upon determining the selected co-host mode as the target co-host mode for the live-streaming room in response to the first user account selecting any one of the first co-host mode, the second co-host mode and the third co-host mode, the method further includes:

receiving a second co-host request from any second user account in the live-streaming room, wherein the second co-host request is configured to acquire a co-host vacant site; and assigning the co-host vacant site to the second user account in response to the co-host vacant site existing in the live-streaming room, and sending live-streaming data of the second user account to the terminal corresponding to the first user account. The co-host vacant site is a co-host site in an idle state.

In some embodiments, in the case that the target co-host mode is determined as the third co-host mode, upon determining the selected co-host mode as the target co-host mode for the live-streaming room in response to the first user account selecting any one of the first co-host mode, the second co-host mode and the third co-host mode, the method further includes:

sending a third co-host request to the terminal corresponding to the first user account in response to receiving the third co-host request from the any second user account in the live-streaming room, wherein the third co-host request is configured to request co-hosting with the first user account; and sending live-streaming data of the second user account to the terminal corresponding to the first user account in response to the first user account accepting the third co-host request.

Figure 4:
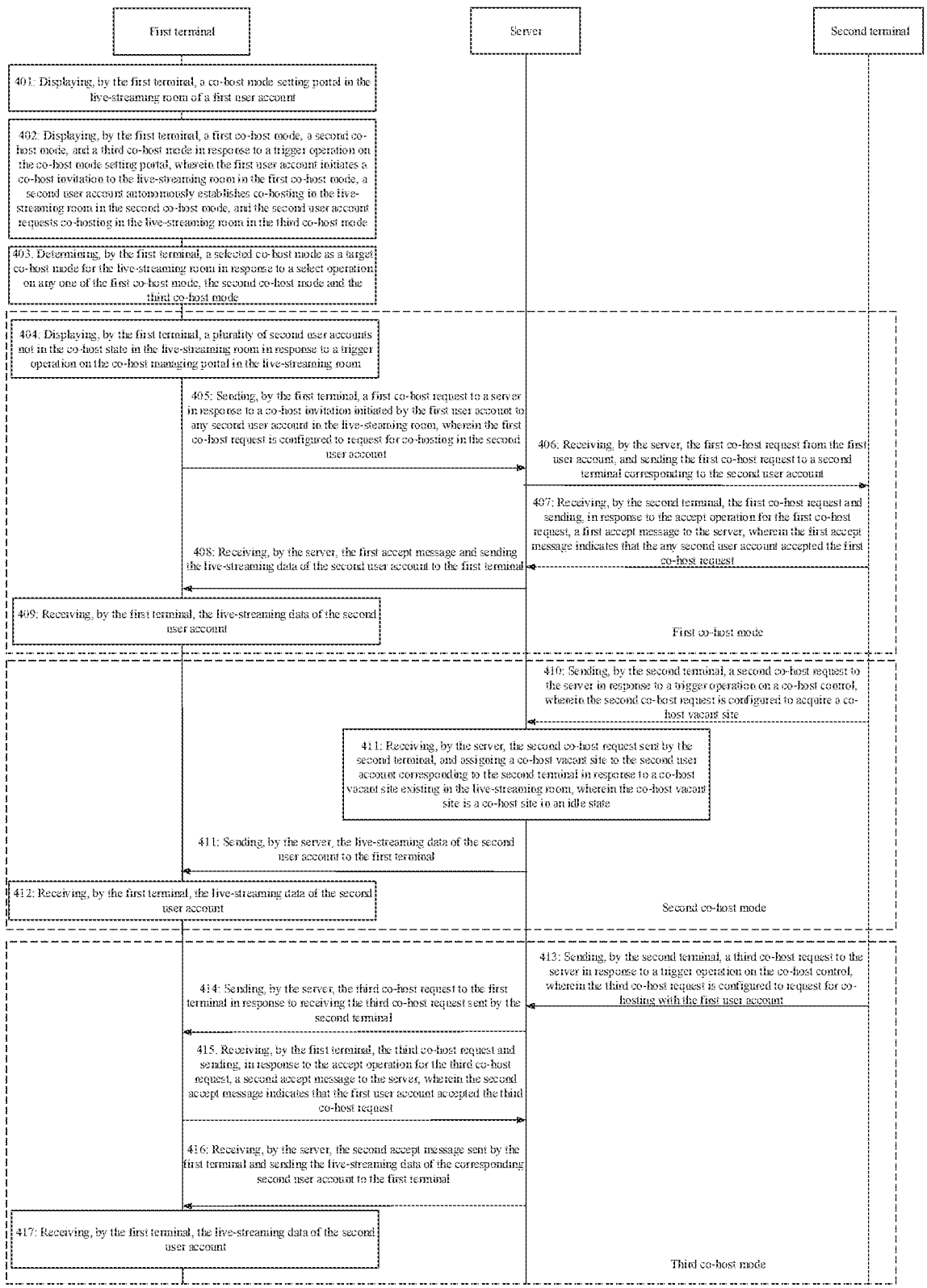
FIG. 4 is a flowchart of a method for establishing co-hosting in live-streaming according to some embodiments of the present disclosure.

FIGS. 2 to 3 merely show the basic flowchart of the present disclosure, and the solution according to the present disclosure is further described below based on some embodiments. FIG. 4 is a flowchart of a method for establishing co-hosting in live-streaming according to some embodiments of the present disclosure. As shown in FIG. 4, the method includes following processes.

In 401, the first terminal displays a co-host mode setting portal in the live-streaming room of a first user account.

In embodiments of the present disclosure, the first terminal is a terminal corresponding to the first user account in the live-streaming room. The first user account is determined as the live streamer account, and the first terminal is correspondingly the live streamer terminal. The first user indicates the live streamer subsequently in the present disclosure. In some embodiments of the present disclosure, the server provides a co-host mode setting portal for the live-streaming room of the first user account. When the first user opens the live-streaming room via a target application, the co-host mode setting portal is displayed in the live-streaming room of the first user account, such that the first user can set the co-host mode of the live-streaming room via the co-host mode setting portal, and then co-hosting in the live-streaming can be carried out based on the set co-host mode. In some embodiments, the process of displaying the co-host mode setting portal in the live-streaming room of the first user account is namely the process of displaying the co-host mode setting portal in the live-streaming interface of the first terminal. The live-streaming interface is an interface corresponding to the live-streaming room of the first user account, i.e., the live-streaming interface on the live streamer side.

In some embodiments, the process of the first terminal displaying the co-host mode setting portal in the live-streaming room of the first user account includes any one of following 401A, 401B and 401C.

(401A) In some embodiments, the live-streaming room includes a plurality of co-host sites. Accordingly, displaying the co-host mode setting portal by the first terminal includes that the first terminal displays the first co-host managing panel in response to a trigger operation on the target co-host site, and the co-host mode setting portal is displayed in the first co-host managing panel. In some embodiments, the first terminal displays a plurality of co-host sites in the live-streaming interface. In response to the trigger operation on the target co-host site of the plurality of co-host sites, the first terminal displays the first co-host managing panel in which the co-host mode setting portal is displayed.

The target co-host site is a co-host site corresponding to any second user account in the live-streaming room. It should be noted that the target co-host site is a co-host site in the co-host state. That is, the second use account occupying the target co-host site is co-hosting with the first user account. The first co-host managing panel is configured to manage the co-host permission of the account corresponding to the target co-host site.

Figure 5:
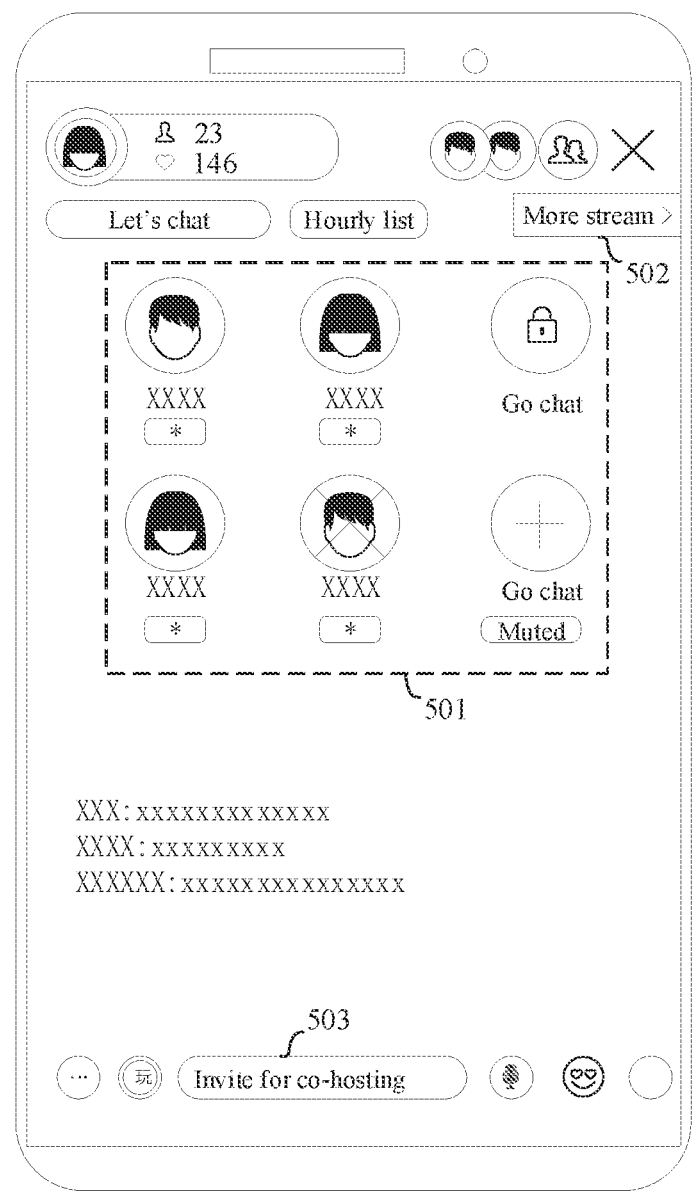
FIG. 5 is a schematic diagram of a live-streaming interface according to some embodiments of the present disclosure.
Figure 6:
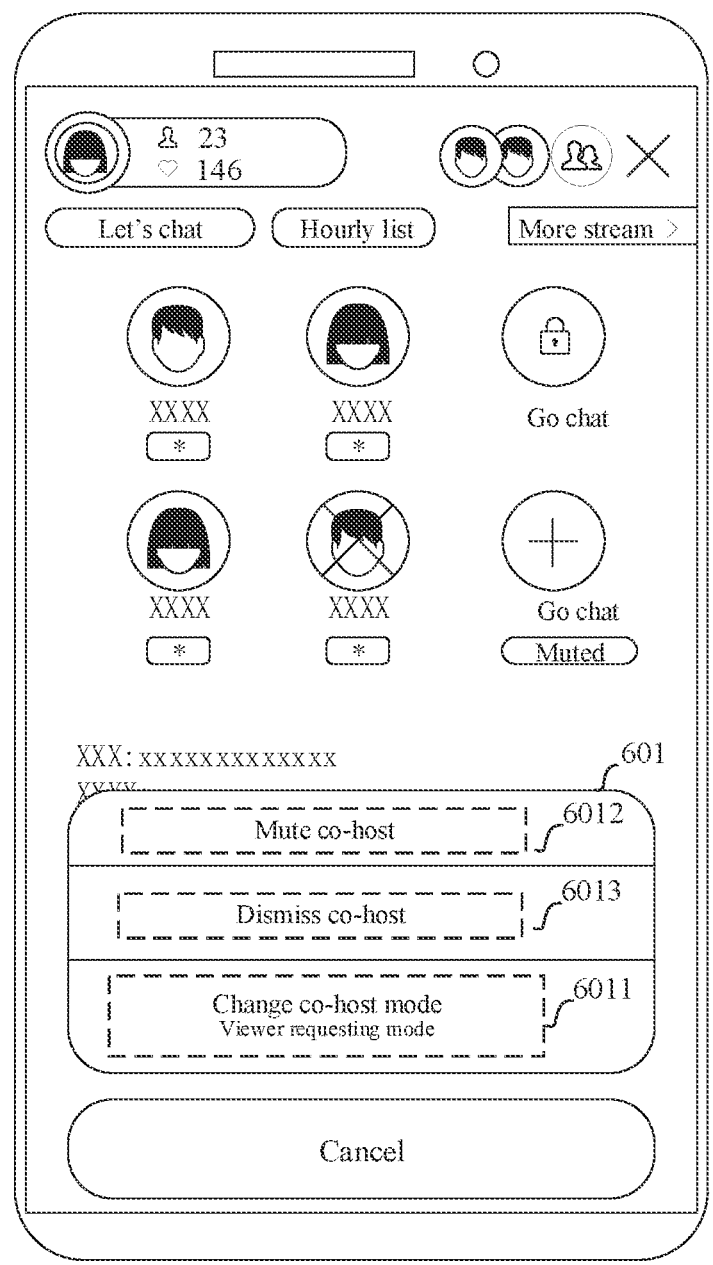
FIG. 6 is a schematic diagram of a first co-host managing panel according to some embodiments of the present disclosure.

In an exemplary embodiment, FIG. 5 is a schematic diagram of a live-streaming interface according to some embodiments of the present disclosure. Referring to FIG. 5, the live-streaming interface shown in FIG. 5 is displayed by the first terminal, that is, the live-streaming interface is an interface corresponding to the live-streaming room of the first user account. In some embodiments, the co-host site may be the "Co-host site" control 501 shown in FIG. 5, and the target co-host site may be the co-host site corresponding to the viewer account in the "Co-host site" control 501. In some embodiments, FIG. 6 is a schematic diagram of displaying a first co-host managing panel according to some embodiments of the present disclosure. Referring to FIG. 6, the first co-host managing panel may be the "Co-host site management" panel 601 shown in FIG. 6, and the co-host mode setting portal may be the "Change co-host mode" control 6011 in the "Co-host site management" panel 601.

In the aforesaid embodiments, the first co-host managing panel can be displayed by triggering the target co-host site, and the first co-host managing panel is displayed based on the display instruction, and thereby the co-host mode can be set via the co-host mode setting portal in the first co-host managing panel, which simplifies the operation process and improves the efficiency of human-computer interaction.

In some embodiments, the first co-host managing panel further includes a mute control and a dismiss control. Accordingly, the first terminal sets the target co-host site to the mute state in response to a trigger operation on the mute control in the first co-host managing panel, and the mute state is that the account corresponding to the target co-host site is muted, and neither the live streamer nor other users can hear the voice of the account corresponding to the target co-host site. The first terminal revokes the co-host permission of the account corresponding to the target co-host site in response to a trigger operation on the dismiss control in the first co-host managing panel. Revoking the co-host permission of the account corresponding to the target co-host site indicates that the account corresponding to the target co-host is "kicked out" of the target co-host site and the co-hosting between the account corresponding to the target co-host site and the live streamer account is interrupted. In some embodiments, the mute control may be the "Mute co-host" control 6012 shown in FIG. 6, and the dismiss control may be the "Dismiss co-hos" control 6013 shown in FIG. 6. In the embodiment, the mute control or dismiss control in the first co-host managing panel allows the first user to control the co-host permission of each co-hosted account in the live-streaming room, which improves the flexibility and efficiency in co-host management.

(401B) In some embodiments, the live-streaming room includes a live-streaming room setting portal. Accordingly, displaying the co-host mode setting portal by the first terminal includes that the first terminal displays the live-streaming room setting panel in response to a trigger operation on the live-streaming room setting portal. The live-streaming room setting panel is configured to set the information associated with the live-streaming room, and the co-host mode setting portal is displayed in the live-streaming room setting panel. In some embodiments, the information associated with the live-streaming room includes the title of the live-streaming room, the location of the controls in the live-streaming room and the push stream address of the live-streaming room, etc.

Figure 7:
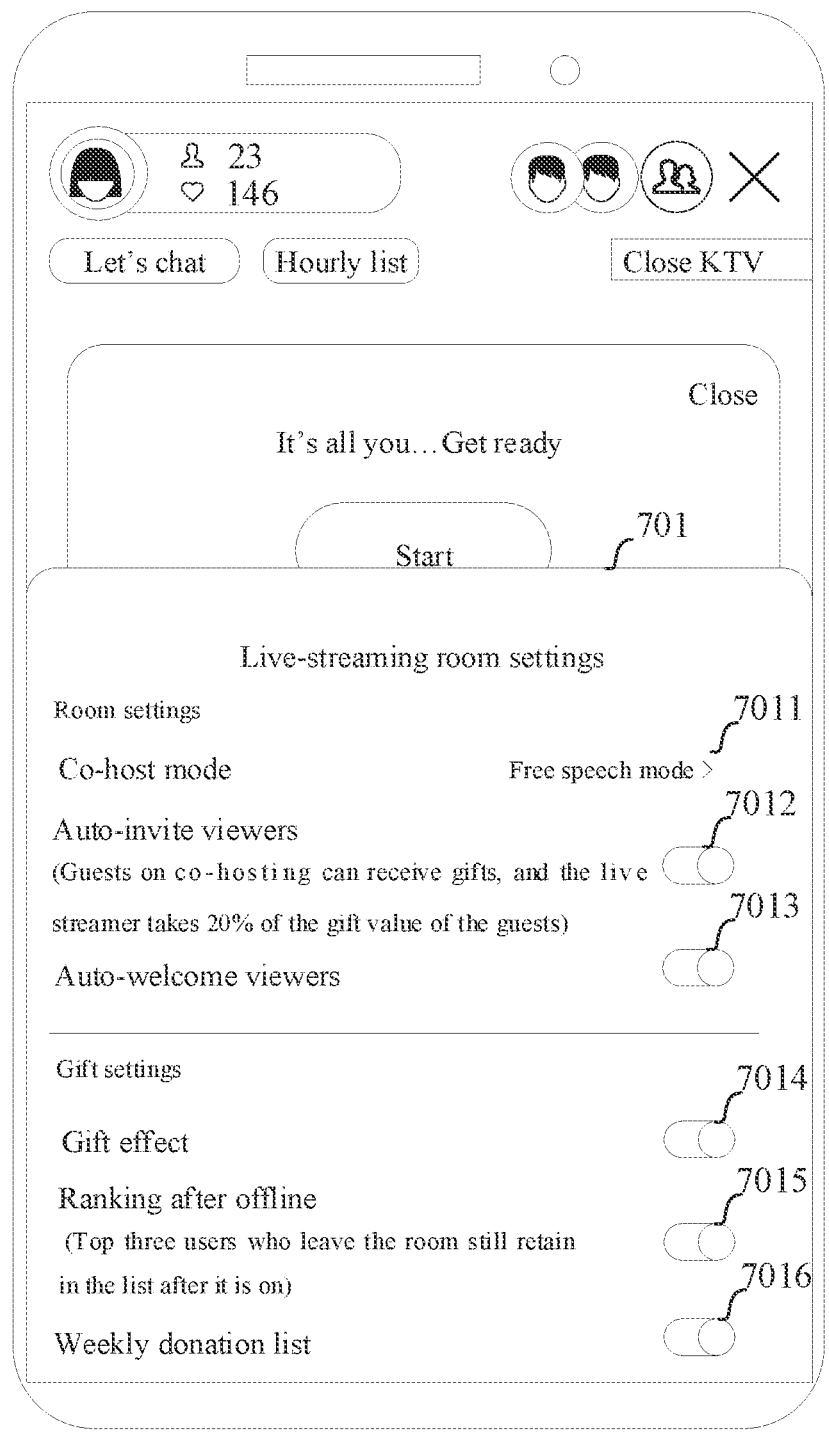
FIG. 7 is a schematic diagram of a live-streaming room setting panel according to some embodiments of the present disclosure.

Referring to FIG. 5, the live-streaming room setting portal may be the "More Stream" control 502 shown in FIG. 5. In some embodiments, FIG. 7 is a schematic diagram of displaying a live-streaming room setting panel according to some embodiments of the present disclosure. In some embodiments, the live-streaming room setting panel may be the "Live-streaming room settings" panel 701 shown in FIG. 7, and the co-host mode setting portal may be the "Co-host mode" control 7011 in the "Live-streaming room settings" panel 701.

In the aforesaid embodiments, the live-streaming room setting panel can be displayed by triggering the live-streaming room setting portal, and the live-streaming room setting panel is displayed based on the display instruction, and the co-host modes can thereby be set via the co-host mode setting portal in the live-streaming room setting panel, which simplifies the operation process and improves the efficiency of human-computer interaction.

Referring to FIG. 7, the live-streaming room setting panel 701 further includes controls for setting information associated with the live-streaming room, such as "Auto-invite viewers" control 7012, "Auto-welcome viewers" control 7013, "Gift effect" 7014, "Ranking after offline" control 7015, and "Weekly donation list" control 7016, etc.

(401C) In some embodiments, the live-streaming room includes a co-host management portal. Accordingly, displaying the co-host mode setting portal by the first terminal includes that the first terminal displays a second co-host managing panel in response to a trigger operation on the co-host management portal. The second co-host managing panel is configured to display the co-host state of the second user account in the live-streaming room, and the co-host mode setting portal is displayed in the second co-host managing panel.

Figure 8:
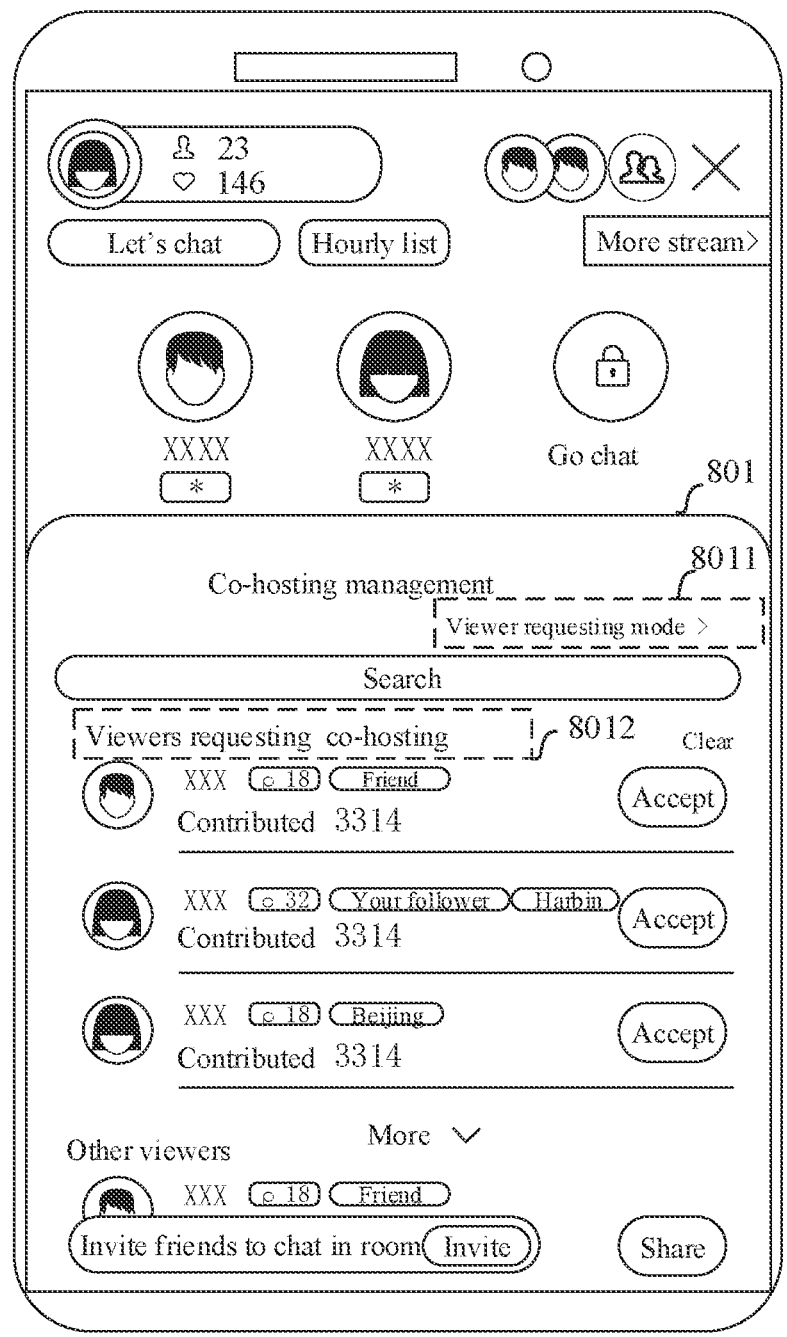
FIG. 8 is a schematic diagram of a second co-host managing panel according to some embodiments of the present disclosure.

In some embodiments, the co-host management portal may be the "Invite for co-hosting" control 503 shown in FIG. 5. In some embodiments, FIG. 8 is a schematic diagram of displaying a second co-host managing panel according to some embodiments of the present disclosure. In some embodiments, the second co-host managing panel may be the "Co-hosting management" panel 801 shown in FIG. 8, and the co-host mode setting portal may be the "Co-host mode" control 8011 in the "Co-hosting management" panel 801.

In some embodiments, the first terminal displays, in the co-host mode setting portal, the co-host mode of the live-streaming room at the present moment. Referring to FIG. 6, the "Change co-host mode" control 6011 displays the co-host mode of the live-streaming room at the present moment, such as "Viewer requesting mode". Referring to FIG. 7, the "Co-host mode" set control 7011 shows the co-host mode of the live-streaming room at the present moment, such as "Free speech mode". Referring to FIG. 8, the "Co-host mode" set control 8011 shows the co-host mode of the live-streaming room at the present moment, such as "Viewer requesting mode".

In the aforesaid embodiments, the second co-host managing panel can be displayed by triggering the co-host management portal, and the second co-host managing panel is displayed based on the display instruction, and the co-host mode can thereby be set via the co-host mode setting portal in the second co-host managing panel, which simplifies the operation process and improves the efficiency of human-computer interaction.

Returning to refer to FIG. 4, the method further includes 402. In 402, the first terminal displays a first co-host mode, a second co-host mode, and a third co-host mode in response to a trigger operation on the co-host mode setting portal. The first user account initiates a co-host invitation to the live-streaming room in the first co-host mode, at least one second user account autonomously establishes co-hosting in the live-streaming room in the second co-host mode, and the second user account requests co-hosting in the live-streaming room in the third co-host mode. The second user account is a viewer account in the live-streaming room.

The first co-host mode refers to a mode in which co-hosting is established in the live-streaming room in response to the second user account accepting the co-host invitation from the first user account. The second co-host mode refers to a mode in which co-hosting is established in the live-streaming room in response to the second user account requesting for co-hosting, which requires no allowance of the first user account. The third co-host mode refers to a mode in which co-hosting is established in the live-streaming room in response to the first user account responding to the co-host request of the second user account. In some embodiments, the trigger operation on the co-host mode setting portal includes a click operation on the co-host mode setting portal.

In some embodiments, the first terminal, in response to a trigger operation on the co-host mode setting portal, displays the co-host mode setting panel in which the first co-host mode, the second co-host mode, and the third co-host mode are displayed. In this embodiment, three co-host modes can be provided clearly and intuitively by displaying the three co-host modes in the co-host mode setting panel, which facilitates the first user to set the co-host modes based on the co-host mode setting panel, thereby improving the efficiency of human-computer interaction.

Figure 9:
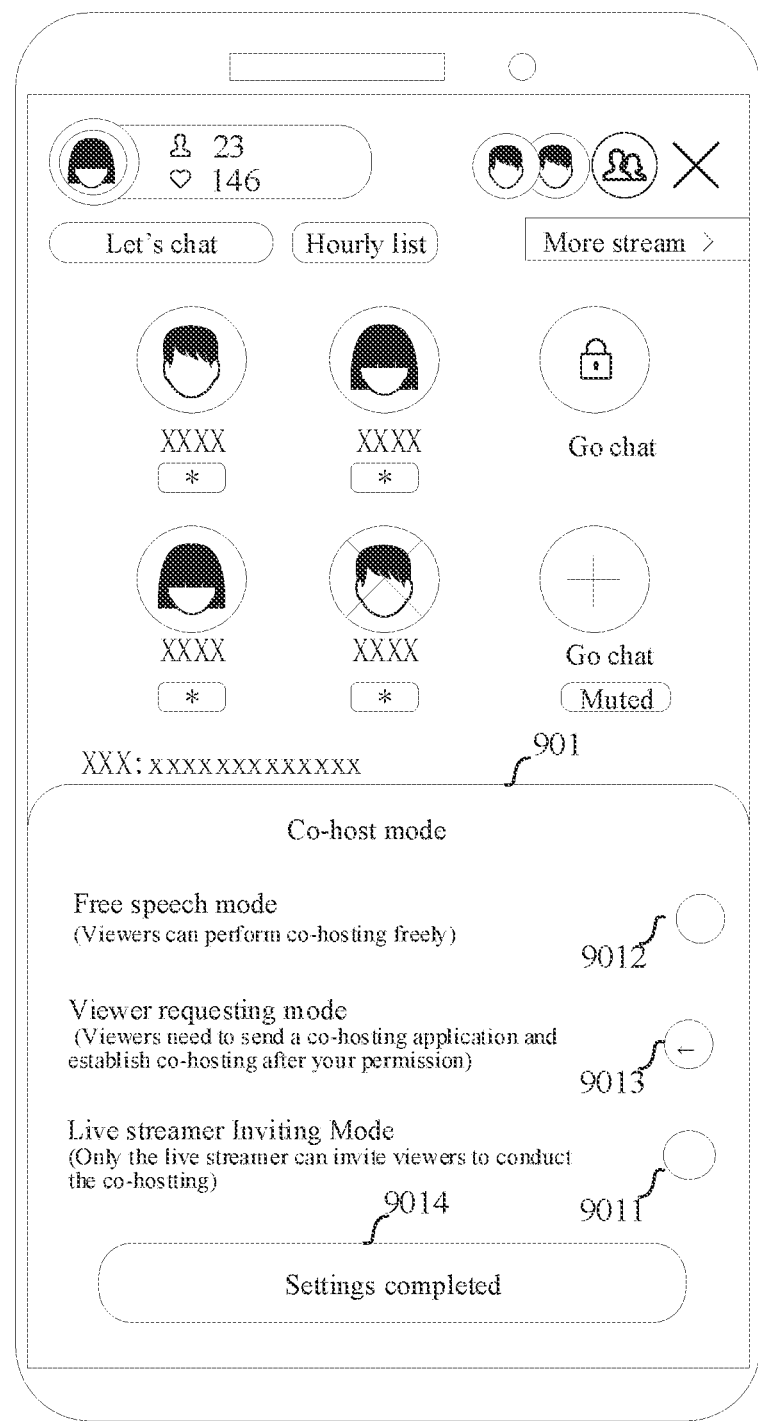
FIG. 9 is a schematic diagram of a co-host mode setting panel according to some embodiments of the present disclosure.

In some embodiments, FIG. 9 is a schematic diagram of displaying a co-host mode setting panel according to some embodiments of the present disclosure. In some embodiments, the co-host mode setting panel may be the "Co-host mode" setting panel 901 shown in FIG. 9, the first co-host mode may be the "Live streamer inviting mode" 9011 shown in FIG. 9, the second co-host mode may be the "Free speech mode" 9012 shown in FIG. 9, and the third co-host mode may be the "Viewer requesting mode" 9012 shown in FIG. 9.

Returning to refer to FIG. 4, the method further includes 403. In 403, the first terminal determines a selected co-host mode as a target co-host mode for the live-streaming room in response to a select operation on any one of the first co-host mode, the second co-host mode and the third co-host mode.

In some embodiments, the first terminal acquires the selected co-host mode in response to the select operation on any one of the first co-host mode, the second co-host mode and the third co-host mode, and sends the selected co-host mode to the server in response to the submit operation on the selected co-host mode. Then, the server receives the selected co-host mode and determines the selected co-host mode as the target co-host mode for the live-streaming room. In some embodiments, the submit operation is a trigger operation on a submit control. In some embodiments, the submit control may be the "Setting Completed" control 9014 shown in FIG. 9.

It should be noted that the setting process of the first user for the co-host mode in aforesaid processes 401 to 403 may be performed prior to the live-streaming or during the live-streaming, and the setting process of the first user for the co-host mode may be performed one or more times during one live-streaming. This embodiment of the present disclosure does not limit the time and numbers for performing the setting process of the co-host mode. The following describes how to perform co-hosting in live-streaming room based on the first co-host mode, the second co-host mode and the third co-host mode, respectively.

A reference is made to processes 404 to 409 for co-hosting in live-streaming room based on the first co-host mode.

In 404, the first terminal displays a plurality of second user accounts not in the co-host state in the live-streaming room in response to a trigger operation on the co-host management portal in the live-streaming room.

Not in the co-host state indicates a state in which the second user accounts are not co-hosting with the first user account.

In some embodiments, the first terminal displays the second co-host managing panel in response to a trigger operation on the co-host management portal in the live-streaming room. A plurality of second user accounts not in the co-host state in the live-streaming room are displayed in the second co-host managing panel.

Figure 10:
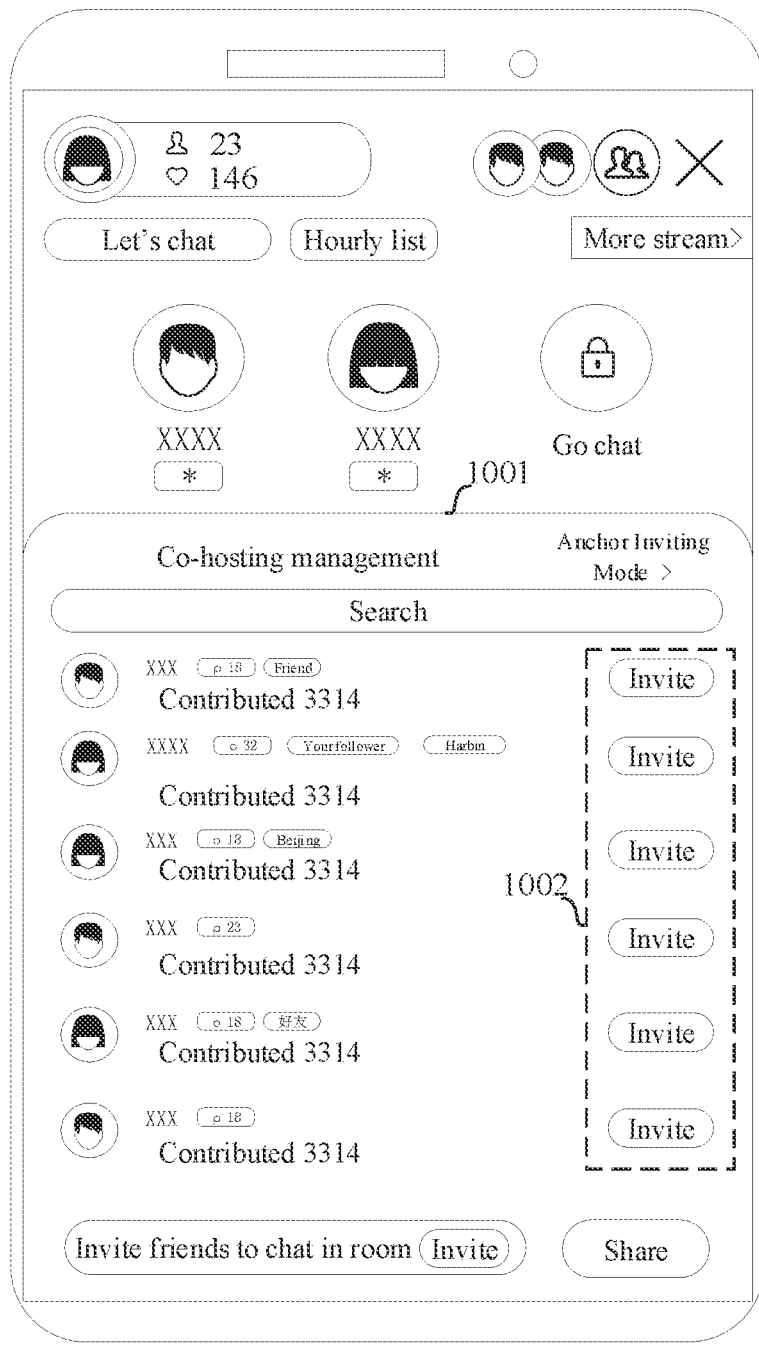
FIG. 10 is another schematic diagram of a second co-host managing panel according to some embodiments of the present disclosure.

In some embodiments, FIG. 10 is another schematic diagram of displaying a second co-host managing panel according to some embodiments of the present disclosure. In some embodiments, the "Co-hosting management" panel

1001 shown in FIG. 10 is the second co-host managing panel corresponding to the first co-host mode (that is, the live streamer inviting mode).

In the aforesaid embodiments, a plurality of second user accounts not in the co-host state is displayed by triggering the co-host management portal, and the first user can thereby perform the subsequent process of co-host invitation based on the displayed plurality of second user accounts, which simplifies the operation process and improves the efficiency of human-computer interaction.

In some embodiments, the first terminal displays a co-host site in the live-streaming room as an inoperable state in a case of the target co-host mode being determined as the first co-host mode. In some embodiments, the inoperable state is a grayed state, that is, the color of the co-host site is adjusted to gray. In the embodiment, by displaying the co-host site as the inoperable state, the second user account in the live-streaming room is prevented from requesting for co-hosting in live-streaming room via the co-host site, which ensures that the first user account is not disturbed by the co-host request triggered by the second user account in the mode of the first user account initiating the co-host invitation.

In 405, the first terminal sends a first co-host request to a server in response to a co-host invitation initiated by the first user account to any second user account in the live-streaming room. The first co-host request is configured to request co-hosting with the second user account.

In some embodiments, the second co-host managing panel includes a plurality of second user accounts not in the co-host state and invite controls corresponding to the plurality of second user accounts. The first terminal, in response to a trigger operation on any one of the invite controls, generates a first co-host request based on the second user account corresponding to the invite control and then sends the first co-host request to the server. Referring to FIG. 10, the invite control may be the "Invite" control 1002 shown in FIG. 10.

In the aforesaid embodiments, the request of sending the co-host invitation to the server can be triggered by initiating the co-host invitation to the live-streaming to the any second user account, which not only provides a co-host mode for the first user account to invite the second user account, but also simplifies the operation process and improves the efficiency of human-computer interaction.

In 406, the server receives the first co-host request from the first user account, and sends the first co-host request to a second terminal corresponding to the second user account.

In some embodiments of the present disclosure, the second terminal is a terminal corresponding to the any second user account in the live-streaming room. The second user account is a viewer account, and accordingly the second terminal is a viewer terminal. The second user indicate the viewer subsequently in the present disclosure.

In some embodiments, the server receives the first co-host request from the first user account and sends, based on the second user account carried by the first co-host request, the first co-host request to the terminal corresponding to the second user account.

In 407, the second terminal receives the first co-host request and sends, in response to the accept operation for the first co-host request, a first accept message to the server. The first accept message indicates that the second user account accepted the first co-host request.

In some embodiments, the second terminal receives the first co-host request, and displays a co-host invitation message corresponding to the first co-host request in the live-streaming room. The co-host invitation message includes an accept control, and the first accept message is sent to the server in response to a trigger operation on the accept control. In some embodiments, the trigger operation on the accept control is a click operation on the accept control.

Figure 11:
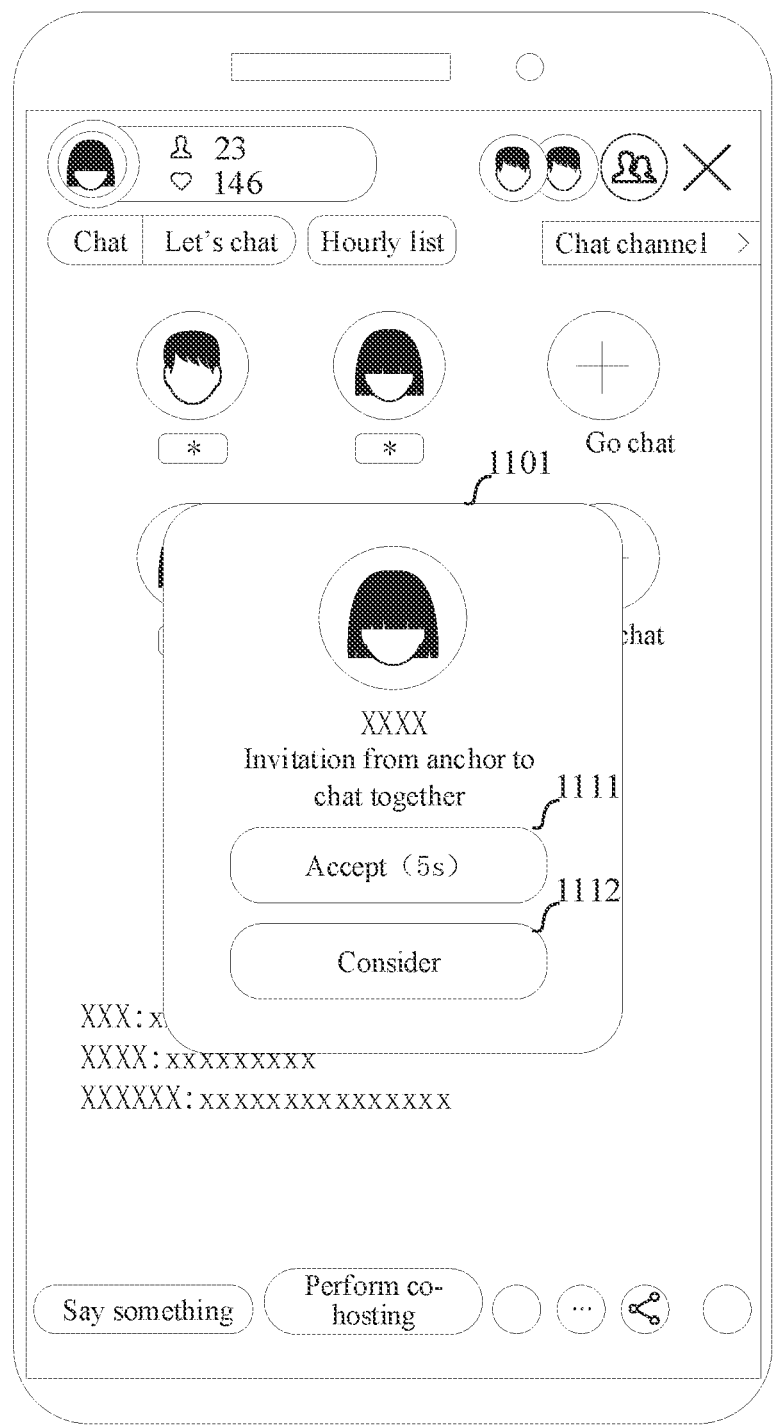
FIG. 11 is a schematic diagram of a co-host invitation message according to some embodiments of the present disclosure.

In some embodiments, FIG. 11 is a schematic diagram of displaying a co-host invitation message according to some embodiments of the present disclosure. In some embodiments, the co-host invitation message may be "Invitation from anchor to chat together" 1101 shown in FIG. 11, and the accept control may be the "Accept" control 1111 shown in FIG. 11. In some embodiments the co-host invitation message further includes a reject control which may be the "Consider" control 1112 shown in FIG. 11.

In 408, the server receives the first accept message and sends the live-streaming data of the second user account to the first terminal.

In some embodiments, the server, in response to the second user account accepting the first co-host request, acquires the live-streaming data of the second user account based on the second user account carried in the first accept message, and then sends the acquired live-streaming data to the first terminal based on the first user account carried in the first accept message. In this embodiment, in the case that the first user account initiates the co-host invitation, the co-hosting with the second user account is only established in response to the second user account accepting the invitation, which ensures the co-hosting experience of the second user. The live-streaming data of the second user account is generated in the case that the second user account is co-hosting with the first user account. That is, the live-streaming data of the second user account includes video stream data or audio stream data, and that is, the video stream data or the audio stream data captured by the terminal corresponding to the second user account.

In some embodiments, the process by which the server acquires the live-streaming data of the second user account may be any one of the following situations.

In some embodiments, the server, in response to the second user account accepting the first co-host request, allows the second terminal corresponding to the second user account to send the live-streaming data to the server. Thus, the second terminal sends the live-streaming data of the second user account to the server, and the server receives the live-streaming data sent by the second terminal and then subsequently sends the live-streaming data to the first terminal.

In some other embodiments, the server, in response to the second user account accepting the first co-host request, sends a data pull notification to the second terminal corresponding to the second user account. Thus, the second terminal sends the live-streaming data of the second user account to the server in response to the data pull notification, and the server receives the live-streaming data sent by the second terminal and then subsequently sends the live-streaming data to the first terminal. The data pull notification herein is configured to pull the live-streaming data corresponding to the second user account.

In 409, the first terminal receives the live-streaming data of the second user account.

The processes 407 to 409 are the process by which the second user account accepts to co-host with the first user account. In some other embodiments, the server sends a co-host prompt message to the terminal corresponding to the first user account in response to the second user account rejecting or failing to respond to the first co-host request. The co-host prompt message is configured to prompt the first user account that the second user account rejects or fails to respond to the first co-host request. Accordingly, the first terminal displays the co-host prompt message in the live-streaming room in response to the second user account rejecting or failing to respond to the first co-host request. The co-host prompt message is configured to prompt the first user account that the second user account rejects or fails to respond to the first co-host request. In the embodiments, in the case that the first user account initiates the co-hosting invitation to the live-streaming room, the co-hosting with the second user account is not established in response to the second user account rejecting or failing to respond, and the first user is prompted that the second user account rejects or fails to respond to the co-host request, such that the first user is informed of the state of the co-host invitation.

The processes 404 to 409 describe co-hosting in live-streaming room based on the first co-host mode. In some embodiments, the first terminal, in response to the select operation on the first co-host mode and any one of the remaining co-host modes, determines the first co-host mode and the other selected co-host mode as the target co-host mode of the live-streaming room. That is, in the mode in which the second user account autonomously establishes co-hosting in the live-streaming room or in the mode in which the second user account requests co-hosting in the live-streaming room, co-hosting in the live-streaming may also be implemented based on the mode in which the first user account initiates the co-host invitation to the live-streaming room.

A reference is made to processes 410 to 412 for co-hosting in the live-streaming room based on the second co-host mode.

In 410, the second terminal sends a second co-host request to the server in response to a trigger operation on a co-host control. The second co-host request is configured to acquire a co-host vacant site.

The co-host control is a control for the second user account to establish co-hosting in the live-streaming room. Acquiring the co-host vacant site indicates acquiring access to the corresponding co-host vacant site. In some embodiments, the co-host control is a co-host vacant site in the live-streaming room or a co-host request control in the live-streaming room. The co-host vacant site refers to the co-host site in an idle state, i.e., a co-host site not in the co-host state. In some embodiments, the trigger operation on the co-host control is a click operation on the co-host control.

In some embodiments, the second terminal sends the second co-host request to the server in response to a trigger operation on any co-host vacant site in the live-streaming room. In some embodiments, the second terminal sends the second co-host request to the server in response to a trigger operation on the co-host request control in the live-streaming room. In the embodiment, by setting the co-host vacant site or the co-host request control, the second user can trigger the second terminal to send the second co-host request to the server by triggering the co-host vacant site or the co-host request control, which simplifies the operation processes and improves the efficiency of human-computer interaction.

Figure 12:
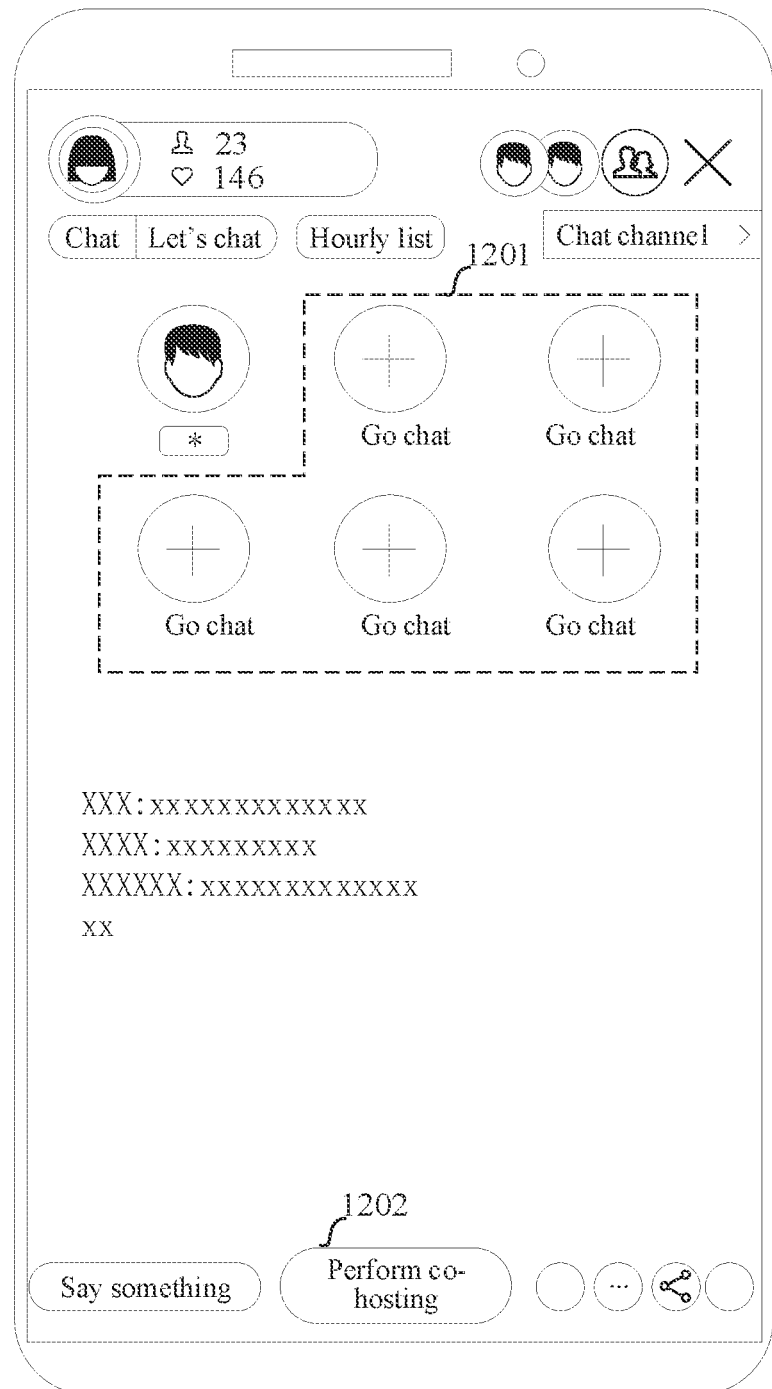
FIG. 12 is a schematic diagram of another live-streaming interface according to some embodiments of the present disclosure.

In some embodiment, FIG. 12 is a schematic diagram of a live-streaming interface according to some embodiments of the present disclosure. In some embodiments, the co-host control may be the "Vacant co-host site" control 1201 shown in FIG. 12, or may be the "Perform co-hosting" control 1202 shown in FIG. 12.

Figure 13:
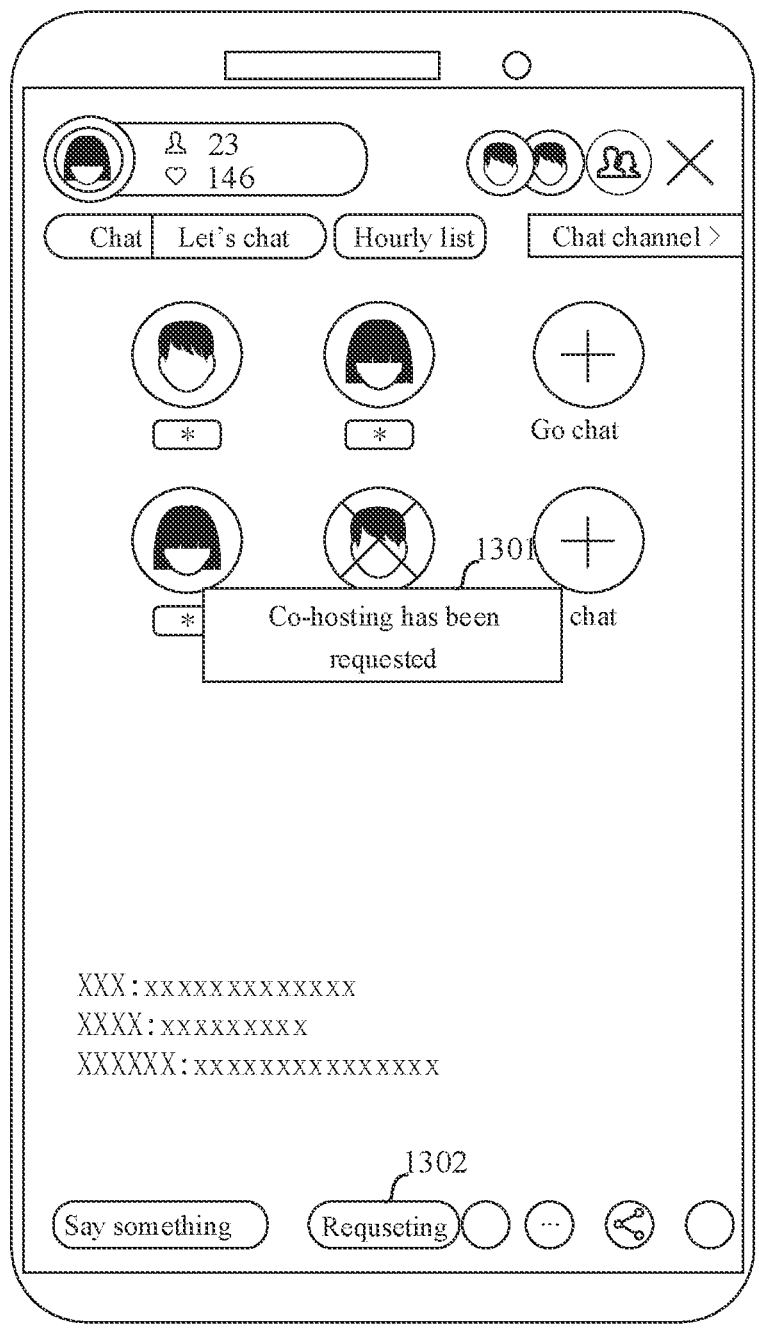
FIG. 13 is a schematic diagram of co-host progress information according to some embodiments of the present disclosure.

In some embodiments, in response to the second terminal sending the second co-host request to the server, the co-host progress information is displayed in the live-streaming room, and the co-host progress information is configured to indicate that co-hosting in the live-streaming room is being requested. In some embodiments, FIG. 13 is a schematic diagram of co-host progress information according to some embodiments of the present disclosure. Referring to FIG. 13, the co-host progress information may be the "Co-hosting has been requested" 1301 shown in FIG. 13. In some embodiments, the second terminal displays the co-host progress information in a region where the co-host request control is configured in the live-streaming room. Referring to FIG. 12 and FIG. 13, the co-host progress information is displayed in the region where the "Perform co-hosting" control 1202 is configured in FIG. 12, and the co-host progress information as displayed may be the "Requesting" control 1302 shown in FIG. 13.

In 411, the server receives the second co-host request sent by the second terminal, assigns a co-host vacant site to the second user account corresponding to the second terminal in response to a co-host vacant site existing in the live-streaming room, and sends the live-streaming data of the second user account to the first terminal. The co-host vacant site herein is a co-host site in an idle state.

In some embodiments, the server receives the second co-host request sent by the second terminal, determines whether a co-host vacant site exists in the live-streaming room corresponding to a live-streaming room identification based on the live-streaming room identification carried by the second co-host request, assigns a co-host vacant site for the second user account corresponding to the second terminal in response to the co-host vacant site existing in the live-streaming room, and sends the live-streaming data of the second user account to the first terminal. It should be understood that the process 411 may be exemplified by sending the live-streaming data of the second user account to the first terminal. In some other embodiments, the server may send the live-streaming data of the second user account to the first terminal and the terminals corresponding to other second user accounts in the live-streaming room. In the embodiment, whether to assign a co-host vacant site to the second user account is determined based on whether a co-host vacant site exits in the live-streaming room, and the second user is thereby allowed to autonomously establish co-hosting in the live-streaming room in response to a co-host vacant site existing in the live-streaming room, which can establish co-hosting in the live-streaming room successfully without the allowance of the first user account and thereby improve the efficiency of co-hosting in live-streaming.

It should be noted that the process 411 is implemented in the case that a co-host vacant site exits in the live-streaming room. In some embodiments, the server sends a co-host failure message to the second terminal in response to no co-host vacant site existing in the live-streaming room. The co-host failure message is configured to indicate that co-hosting in the live-streaming room fails.

In 412, the first terminal receives the live-streaming data of the second user account.

In the aforesaid embodiments, in response to the any second user account in the live-streaming room initiating a second co-host request and a co-host vacant site existing in the live-streaming room, the first terminal receives the live-streaming data of the second user account, and the second user account is allowed to implement co-hosting in the live-streaming room autonomously, which establishes co-hosting in the live-streaming room successfully without the allowance of the first user account, and thereby improves the efficiency of co-hosting in live-streaming.

A reference is made to processes 413 to 417 for co-hosting in the live-streaming room based on the third co-host mode.

In 413, the second terminal sends a third co-host request to the server in response to a trigger operation on the co-host control. The third co-host request is configured to request co-hosting with the first user account.

It should be noted that the process of triggering the second terminal to send the third co-host request in 413 is same as the process of triggering the second terminal to send the second co-host request in 410 and is not repeated here.

In 414, the server sends the third co-host request to the first terminal in response to receiving the third co-host request sent by the second terminal.

In some embodiments, in response to receiving the third co-host request sent by the second terminal, the server sends the third co-host request to the terminal corresponding to the first user account based on the first user account carried by the third co-host request. That is, the server sends the third co-host request to the first terminal.

In 415, the first terminal receives the third co-host request and sends, in response to the accept operation for the third co-host request, a second accept message to the server. The second accept message indicates that the first user account accepted the third co-host request.

The second accept message indicates that the first user account accepted the third co-host request, that is, the second accept message indicates that the first user account accepted the co-hosting with the corresponding second user account.

Figure 14:
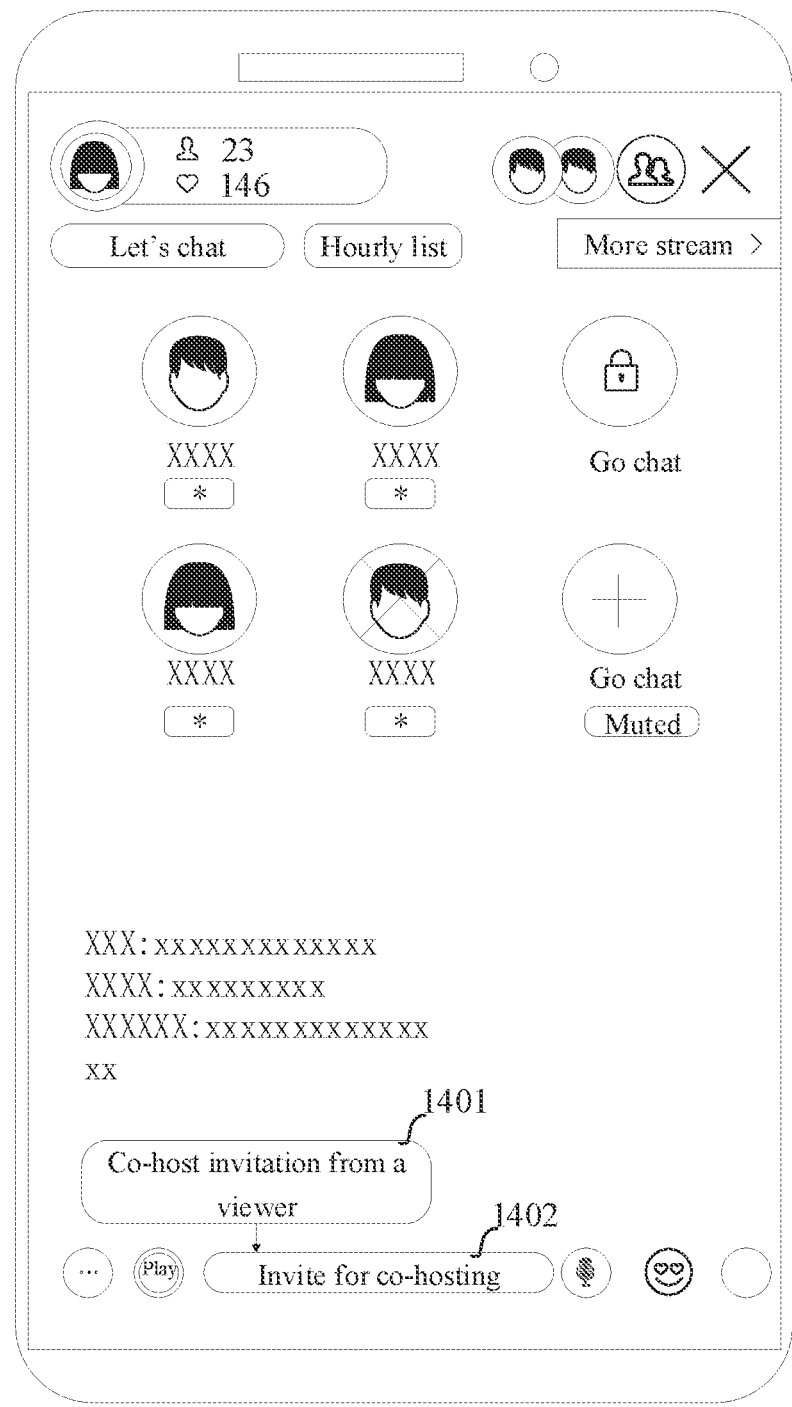
FIG. 14 is a schematic diagram of a co-host request message according to some embodiments of the present disclosure.

In some embodiments, the first terminal displays a co-host request message corresponding to the third co-host request in the live-streaming room in response to receiving the third co-host request, displays the co-host request message and the corresponding accept control in response to the trigger operation on the co-host request message, and sends a first accept message to the server in response to the trigger operation on the accept control. FIG. 14 is a schematic diagram of displaying a co-host request message according to some embodiments of the present disclosure. Referring to FIG. 14, the co-host request message may be the "Co-host request of a viewer" message 1401 shown in FIG. 14.

Optionally, the first terminal displays the co-host request message corresponding to the third co-host request in the region where the co-host management portal is configured in the live-streaming room. Referring to FIG. 14, the co-host management portal may be the "Invite for co-hosting" control 1402 shown in FIG. 14.

In some embodiments, the first terminal displays a plurality of co-host request messages in the live-streaming room in response to a trigger operation on the co-host management portal, and the co-host request message indicates that a corresponding second user account requests co-hosting with the first user account. Optionally, the first terminal, in response to a trigger operation on a target control, displays a second co-host managing panel in which a plurality of co-host request messages in the live-streaming room are displayed. Referring to FIG. 8, the "Co-hosting management" panel 801 shown in FIG. 8 is the second co-host managing panel corresponding to the third co-host mode (i.e., viewer requesting mode). In this panel, a plurality of second user accounts that have submitted the co-host requests are displayed, such as the "Viewers requesting co-hosting" 8012 shown in FIG. 8. In the embodiment, a plurality of co-host request messages are displayed in the live-streaming room, such that the first user can perform the co-hosting process based on the plurality of displayed co-host request messages.

Figure 15:
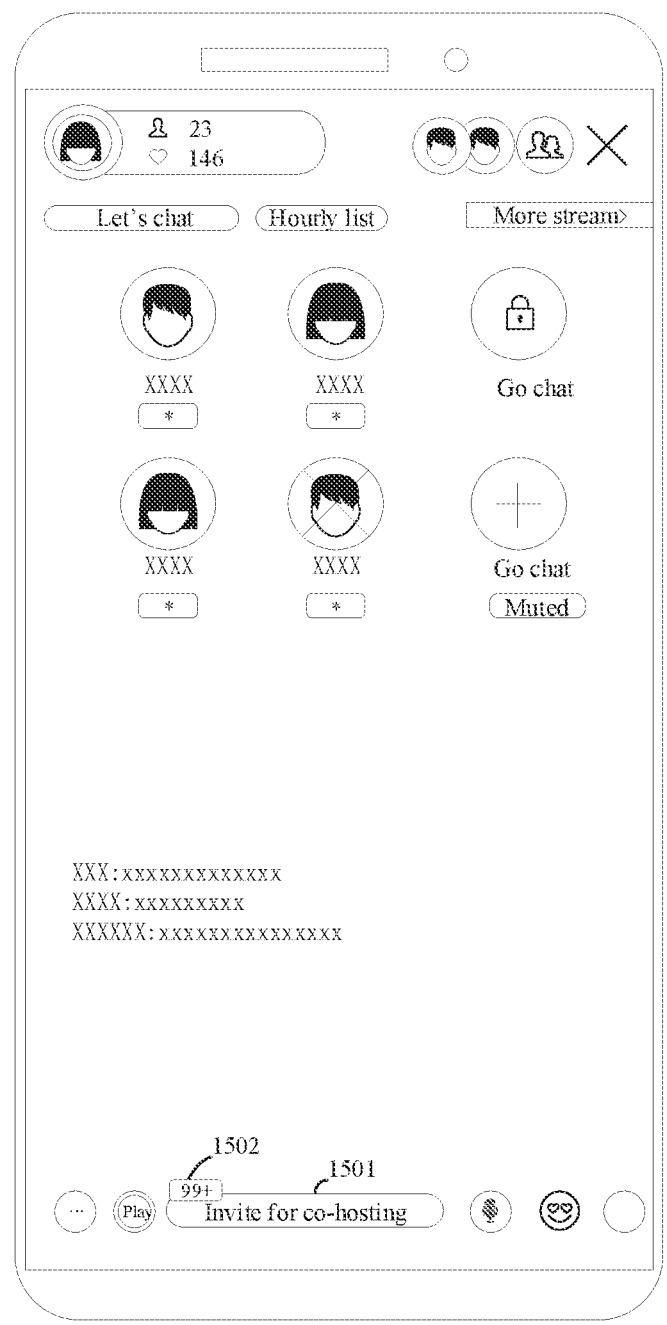
FIG. 15 is a schematic diagram of the number of accounts that have submitted a co-host request according to some embodiments of the present disclosure.

In some embodiments, the first terminal displays, in the live-streaming room, the number of accounts that have submitted the co-host request at the present moment. In some embodiments, the first terminal displays, in a region where the co-host management portal for the live-streaming room is configured, the number of accounts that have submitted the co-host request at the present moment. As a result, the amount of information displayed in the live-streaming room is increased, such that the first user can be informed of the number of accounts that have requested for co-hosting in the live-streaming room. In some embodiments, FIG. 15 is a schematic diagram of displaying the number of accounts that have submitted co-host requests according to some embodiments of the present disclosure. Referring to FIG. 15, the co-host management portal may be the "Invite for co-hosting" control 1501 shown in FIG. 15, and the number of accounts that have submitted the co-host request may be displayed as digital mark 1502 shown in FIG. 15.

In 416, the server receives the second accept message sent by the first terminal and sends the live-streaming data of the corresponding second user account to the first terminal.

In some embodiments, the server, in response to the first user account accepting the third co-host request, acquires the live-streaming data of the second user account based on the second user account carried in the second accept message, and then sends the required live-streaming data to the first terminal based on the first user account carried in the second accept message.

In 417, the first terminal receives the live-streaming data of the second user account.

In the aforesaid embodiments, in the case that the any second user account initiates a co-host request, co-hosting in the live-streaming room is established in response to the first user accepting the co-host request, which provides a mode in which co-hosting is established in response to the first user account accepting the request of the second user account.

In some embodiments, the any second user account involved in the aforesaid embodiments is an account having co-host permission, and the account having co-host permission is at least one of an account belonging to a same region as the first user account, an account belonging to a target region, an account whose attribute information meets a target condition, an account that already follows the first user account, an account that follows each other with the first user account, or an account that the first user account already follows. The region may be a geographical region, and the account belonging to the same region as the first user account namely indicates at least one second user account in the same region as the region set by the first user account. The target region is a predetermined constant region, such as a certain district in a city. The attribute information may be the age, gender, etc. of the second user account. In the embodiment, by providing the first user with a variety of options for setting the co-host permission, the first user can decide whether to grant the co-host permission to the second user based on characteristics information of the second user account, which enriches dimensions of the first user in managing the co-host permission of the second user and improves the flexibility of the first user in managing the co-host permission of the second user.

In the technical solution according to embodiments of the present disclosure, three co-host modes can be displayed by triggering the co-host mode setting portal, which enriches the co-host mode of the live-streaming room and facilitates the first user to set the co-host mode of the live-streaming room flexibly based on the co-hosting situation in the live-streaming room, such that the efficiency of co-hosting in live-streaming can be improved by switching among the three co-host modes.

Figure 16:
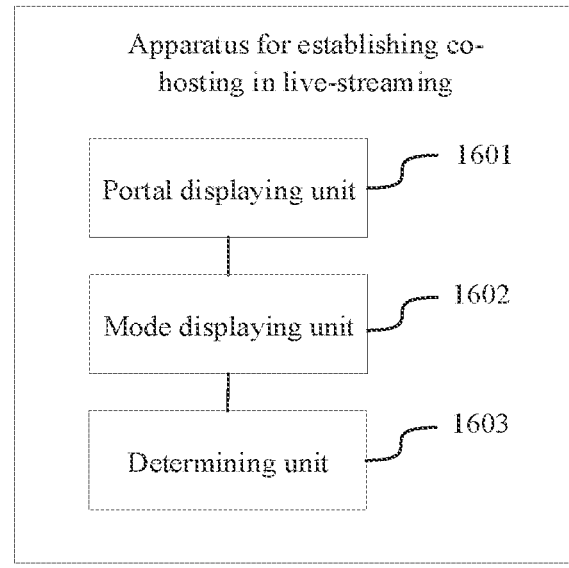
FIG. 16 is a block diagram of an apparatus for establishing co-hosting in live-streaming according to some embodiments of the present disclosure.

FIG. 16 is a block diagram of an apparatus for establishing co-hosting in live-streaming according to some embodiments of the present disclosure. Referring to FIG. 16, the apparatus includes a portal displaying unit 1601, a mode displaying unit 1602, and a determining unit 1603.

The portal displaying unit 1601 is configured to display a co-host mode setting portal in a live-streaming room of a first user account.

The mode displaying unit 1602 is configured to display a first co-host mode, a second co-host mode, and a third co-host mode in response to a trigger operation on the co-host mode setting portal. The first user account initiates a co-host invitation to the live-streaming room in the first co-host mode, at least one second user account autonomously establishes co-hosting in the live-streaming room in the second co-host mode, and the second user account requests co-hosting in the live-streaming room in the third co-host mode. The second user account is a viewer account in the live-streaming room.

The determining unit 1603 is configured to determine a selected co-host mode as a target co-host mode for the live-streaming room in response to a select operation on any one of the first co-host mode, the second co-host mode and the third co-host mode.

In the technical solution according to embodiments of the present disclosure, three co-host modes can be displayed by triggering the co-host mode setting portal, which enriches the co-host mode of the live-streaming room and facilitates the first user to set the co-host mode of the live-streaming room flexibly based on the co-hosting situation in the live-streaming room, such that the efficiency of co-hosting in live-streaming can be improved by switching among the three co-host modes.

In some embodiments, the mode displaying unit 1602 is configured to:
display a co-host mode setting panel in response to the trigger operation on the co-host mode setting portal; and
display the first co-host mode, the second co-host mode, and the third co-host mode in the co-host mode setting panel.

In some embodiments, the apparatus further includes a control displaying unit, and the control displaying unit is configured to:
display a co-host control in the live-streaming room as an inoperable state in a case of the target co-host mode being determined as the first co-host mode, wherein the second user account establishes co-hosting by the co-host control.

In some embodiments, the apparatus further includes a sending unit, and the sending unit is configured to:
send a first co-host request to a server in response to a co-host invitation initiated by the first user account to any second user account in the live-streaming room in a case of the target co-host mode being determined as the first co-host mode. The first co-host request is configured to request co-hosting with the second user account.

In some embodiments, the apparatus further includes an account displaying unit, and the account displaying unit is configured to:
display a plurality of second user accounts not in a co-host state in the live-streaming room in response to a trigger operation on a co-host management portal in the live-streaming room.

In some embodiments, the apparatus further includes a receiving unit, and the receiving unit is configured to:
receive live-streaming data of the second user account in response to the second user account accepting the first co-host request.

In some embodiments, the apparatus further includes an information displaying unit, and the information displaying unit is configured to:
display a co-host prompt message in the live-streaming room in response to the second user account rejecting or failing to respond to the first co-host request. The co-host prompt message is configured to prompt the first user account that the second user account rejects or fails to respond to the first co-host request.

In some embodiments, the live-streaming room includes a plurality of co-host sites, and the portal displaying unit 1601 is configured to:
display a first co-host managing panel in response to a trigger operation on a target co-host site, wherein the first co-host managing panel is configured to manage a co-host permission of an account corresponding to the target co-host site, and the target co-host site corresponds to any second user account in a co-host state in the live-streaming room; and
display the co-host mode setting portal in the first co-host managing panel.

In some embodiments, the apparatus further includes any one of:
a setting unit, configured to set the target co-host site to a muted state in response to a trigger operation on a mute control in the first co-host managing panel; and
a revoking unit, configured to revoke the co-host permission of the account corresponding to the target co-host site in response to a trigger operation on a dismiss control in the first co-host managing panel.

In some embodiments, the live-streaming room includes a live-streaming room setting portal, and the portal displaying unit 1601 is configured to:
display a live-streaming room setting panel in response to a trigger operation on the live-streaming room setting portal, wherein the live-streaming room setting panel is configured to set information associated with the live-streaming room; and
display the co-host mode setting portal in the live-streaming room setting panel.

In some embodiments, the live-streaming room includes a co-host management portal, and the portal displaying unit 1601 is configured to:
display a second co-host managing panel in response to a trigger operation on the co-host management portal, wherein the second co-host managing panel is configured to display co-host states of the second user accounts in the live-streaming room; and
display the co-host mode setting portal in the second co-host managing panel.

In some embodiments, in response to the target co-host mode being determined as the second co-host mode, the apparatus further includes a receiving unit, and the receiving unit is configured to:
receive live-streaming data of the second user account in the live-streaming room in response to the any second user account in the live-streaming room initiating a second co-host request and a co-host vacant site existing in the live-streaming room. The second co-host request is configured to acquire the co-host vacant site which is a co-host site in an idle state.

In some embodiments, in response to the target co-host mode being determined as the third co-host mode, the apparatus further includes a receiving unit, and the receiving unit is configured to:

receive a third co-host request from the any second user account, wherein the third co-host request is configured to request co-hosting with the first user account; and receive live-streaming data of the second user account in response to an accept operation to the third co-host request of the second user account.

In some embodiments, the apparatus further includes an account number displaying unit, and the account number displaying unit is configured to:

display, in the live-streaming room, a number of accounts that have submitted a co-host request at a present moment.

In some embodiments, the apparatus further includes an account number displaying unit, and the account number displaying unit is configured to:

display, in a region where the co-host management portal for the live-streaming room is configured, the number of accounts that have submitted the co-host request at the present moment.

In some embodiments, the apparatus further includes a message displaying unit, and the message displaying unit is configured to:

display a plurality of co-host request messages in the live-streaming room in response to a trigger operation on the co-host management portal. The co-host request message indicates that a corresponding second user account requests co-hosting in the first user account.

In some embodiments, the second user account is an account having co-host permission, and the account having co-host permission is at least one of an account belonging to a same region as the first user account, an account belonging to a target region, an account whose attribute information meets a target condition, an account that already follows the first user account, an account that follows each other with the first user account, or an account that the first user account already follows.

Figure 17:
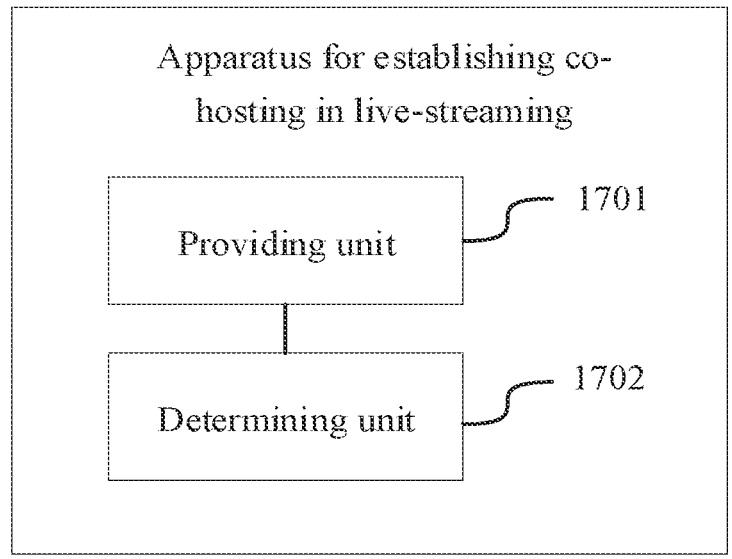
FIG. 17 is a block diagram of an apparatus for establishing co-hosting in live-streaming according to some embodiments of the present disclosure.

FIG. 17 is a block diagram of an apparatus for establishing co-hosting in live-streaming according to some embodiments of the present disclosure. Referring to FIG. 17, the apparatus includes a providing unit 1601 and a determining unit 1703.

The providing unit 1701 is configured to provide a co-host mode setting portal in a live-streaming room of a first user account. The co-host mode setting portal is configured to display a first co-host mode, a second co-host mode, and a third co-host mode in response to being triggered. The first user account initiates a co-host invitation to the live-streaming room in the first co-host mode, at least one second user account autonomously establishes co-hosting in the live-streaming room in the second co-host mode, and the second user account requests co-hosting in the live-streaming room in the third co-host mode, and the second user account is a viewer account in the live-streaming room.

The determining unit 1702 is configured to determine a selected co-host mode as a target co-host mode for the live-streaming room in response to the first user account selecting any one of the first co-host mode, the second co-host mode and the third co-host mode.

In the technical solution according to embodiments of the present disclosure, three co-host modes can be displayed by triggering the co-host mode setting portal, which enriches the co-host mode of the live-streaming room and facilitates the first user to set the co-host mode of the live-streaming room flexibly based on the co-hosting situation in the live-streaming room, such that the efficiency of co-hosting in live-streaming can be improved by switching among the three co-host modes.

In some embodiments, in response to the target co-host mode being determined as the first co-host mode, the apparatus further includes a receiving unit, and the receiving unit is configured to:

receive a first co-host request from the first user account, wherein the first co-host request is configured to request co-hosting with any second user account in the live-streaming room; and send the first co-host request to a terminal corresponding to the second user account.

In some embodiments, the apparatus further includes a sending unit, and the sending unit is configured to:

send live-streaming data of the second user account to a terminal corresponding to the first user account in response to the second user account accepting the first co-host request.

In some embodiments, the apparatus further includes a sending unit, and the sending unit is configured to:

send a co-host prompt message to the terminal corresponding to the first user account in response to the second user account rejecting or failing to respond to the first co-host request. The co-host prompt message is configured to prompt the first user account that the second user account rejects or fails to respond to the first co-host request.

In some embodiments, in response to the target co-host mode being determined as the second co-host mode, the apparatus further includes a receiving unit, and the receiving unit is configured to:

receive a second co-host request from the any second user account in the live-streaming room, wherein the second co-host request is configured to acquire a co-host vacant site; and assign a co-host vacant site to the second user account in response to a co-host vacant site existing in the live-streaming room, and send live-streaming data of the second user account to the terminal corresponding to the first user account. The co-host vacant site is a co-host site in an idle state.

In some embodiments, in response to the target co-host mode being determined as the third co-host mode, the apparatus further includes a receiving unit, and the receiving unit is configured to:

send a third co-host request to the terminal corresponding to the first user account in response to receiving the third co-host request from the any second user account in the live-streaming room, wherein the third co-host request is configured to request co-hosting to the first user account; and send live-streaming data of the second user account to the terminal corresponding to the first user account in response to the first user account accepting the third co-hosting request.

It should be noted that the division of respective functional modules is taken as an example for illustrating the apparatus for establishing co-hosting in live-streaming provided by the foregoing embodiments. In practical applications, the functions may be distributed to different functional modules according to needs. That is, the internal structure of the device is divided into different functional modules to complete all of or a part of the functions described above. In addition, the embodiments of the apparatus for establishing co-hosting in live-streaming belong to the same concept as the embodiments of the method for establishing co-hosting in live-streaming provided in the foregoing embodiments. A reference is made to the method embodiments for the specific implementation process, which will not be repeated herein.

Figure 18:
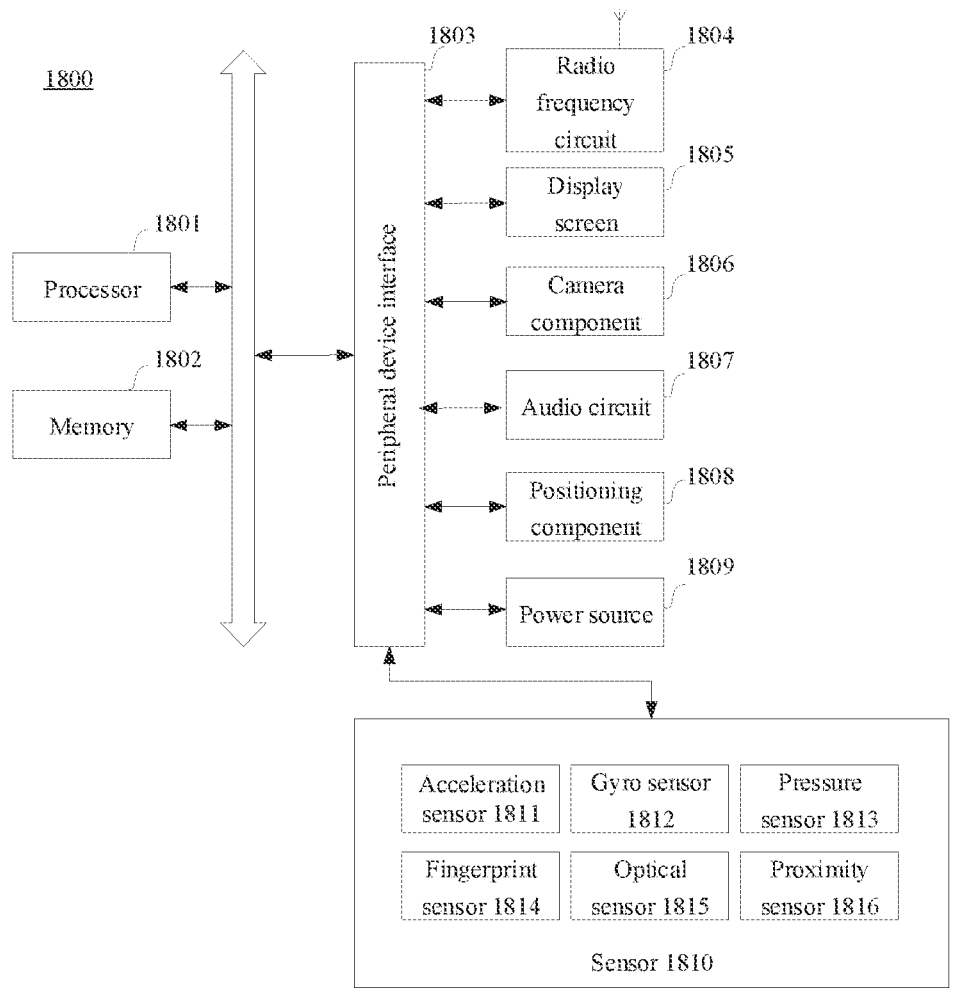
FIG. 18 is a structural block diagram of a terminal according to some embodiments of the present disclosure.

FIG. 18 is a structural block diagram of a terminal 1800 according to some embodiments of the present disclosure. The terminal 1800 may be a smart phone, a tablet computer, a moving picture experts group audio layer III (MP3) player, a moving picture experts group audio layer IV (MP4) player, a laptop or desk computer. The terminal 1800 may also be called user equipment (UE), a portable terminal, a laptop terminal, a desk terminal, etc.

Typically, the terminal 1800 includes a processor 1801 and a memory 1802.

The processor 1801 may include one or more processing cores, such as a 4-core processor, or an 8-core processor, and so on. In some embodiments, the processor 1801 may be integrated with a graphics processing unit (GPU), and the GPU is configured to render and draw the content to be displayed on the display screen.

The memory 1802 may include one or more computer-readable storage media, which may be non-transitory. The memory 1802 may further include a high-speed random access memory and a non-volatile memory, such as one or more magnetic disk storage devices and flash memory storage devices. In some embodiments, the non-transitory computer-readable storage medium in the memory 1802 is configured to store at least one program code. The at least one program code is configured to be executed by the processor 1801 to perform the method for establishing co-hosting in live-streaming executed by the first terminal and the second terminal provided in the method embodiments of the present disclosure.

In some embodiments, the terminal 1800 may optionally further include: a peripheral device interface 1803 and at least one peripheral device. The processor 1801, the memory 1802, and the peripheral device interface 1803 may be connected to each other via a bus or a signal line. Each of the peripheral devices may be connected to the peripheral device interface 1803 through a bus, a signal line, or a circuit board. Specifically, the peripheral device includes: at least one of a radio-frequency circuit 1804, a display screen 1805, a camera component 1806, an audio circuit 1807, a positioning component 1808, and a power source 1809.

The peripheral device interface 1803 may be configured to connect at least one peripheral device related to an input/output (I/O) to the processor 1801 and the memory 1802. In some embodiments, the processor 1801, the memory 1802, and the peripheral device interface 1803 are integrated on the same chip or circuit board. In some embodiments, any one or two of the processor 1801, the memory 1802, and the peripheral device interface 1803 may be implemented on a separate chip or circuit board, which is not limited in this embodiment.

The radio frequency circuit 1804 is configured to receive and transmit radio frequency (RF) signals (also called electromagnetic signals). The radio frequency circuit 1804 communicates with a communication network and other communication devices through electromagnetic signals. The radio frequency circuit 1804 converts electrical signals into electromagnetic signals for transmission, or converts received electromagnetic signals into electrical signals.

The display screen 1805 is configured to display a user interface (UI). The UI may include graphics, text, icons, videos, and any combination thereof. In the case that the display screen 1805 is a touch display screen, the display screen 1805 may further have a capacity to collect touch signals on or above a surface of the display screen 1805. The touch signal may be input to the processor 1801 as a control signal for processing. At this point, the display screen 1805 may further be configured to provide virtual buttons and/or virtual keyboards (also called soft buttons and/or soft keyboards).

The camera component 1806 is configured to collect images or videos. In some embodiments, the camera component 1806 includes a front camera and a rear camera. Generally, the front camera is provided on the front panel of the terminal, and the rear camera is provided on the rear surface of the terminal. In some embodiments, at least two rear cameras are disposed, which may be one of a main camera, a depth-of-field camera, a wide-angle camera, and a telephoto camera, respectively, to realize the fusion of the main camera and the depth-of-field camera for background blurring function, the fusion of the main camera and the wide-angle camera for the panoramic shooting and the virtual reality (VR) shooting functions, or other fusion shooting functions. In some embodiments, the camera component 1806 may further include a flash.

The audio circuit 1807 may include a microphone and a speaker. The microphone is configured to collect sound waves of the users and the environments, convert the sound waves into an electrical signal, and input the electrical signal to the processor 1801 for processing or input to the radio frequency circuit 1804 for voice communication. For the purpose of stereo collection or noise reduction, a plurality of microphones may be provided in different portions of the terminal 1800.

The positioning component 1808 is configured to position a current geographic location of the terminal 1800 to implement navigation or location-based service (LBS). The positioning component 1808 may be the United States' Global Positioning System (GPS), Russia's Global Navigation Satellite System (GLONASS), China's BeiDou Navigation Satellite System (BDS), and the European Union's Galileo Satellite Navigation System (Galileo).

The power source 1809 is configured to power up various components in the terminal 1800. The power source 1809 may be alternating current, direct current, a disposable battery, or a rechargeable battery. In the case that the power source 1809 includes the rechargeable battery, the rechargeable battery may support the wired or wireless charging. The rechargeable battery may further be configured to support quick charge technology.

In some embodiments, the terminal 1800 further includes one or more sensors 1810. The one or more sensors 1810 include, but are not limited to, an acceleration sensor 1811, a gyroscope sensor 1812, a pressure sensor 1813, a fingerprint sensor 1814, an optical sensor 1815, and a proximity sensor 1816.

The acceleration sensor 1811 may detect acceleration on three coordinate axes of the coordinate system established based on the terminal 1800. For example, the acceleration sensor 1811 may be configured to detect components of the gravitational acceleration in the three coordinate axes. The processor 1801 may control the display screen 1805 to display the user interface in a horizontal view or a vertical view according to the gravitational acceleration signal captured by the acceleration sensor 1811. The acceleration sensor 1811 may also be configured to capture motion data of a game or the user.

The gyroscope sensor 1812 may detect an orientation and rotation angle of the body of the terminal 1800, and the gyroscope sensor 1812 may capture 3D motions of a user on the terminal 1800 in cooperation with the acceleration sensor 1811.

The pressure sensor 1813 may be provided on a side frame of the terminal 1800 and/or a lower layer of the display screen 1805. In the case that the pressure sensor 1813 is provided on the side frame of the terminal 1800, a user's holding signal to the terminal 1800 may be detected, such that the processor 1801 performs left-right hand recognition or shortcut operation according to the holding signal captured by the pressure sensor 1813. In the case that the pressure sensor 1813 is disposed at the lower layer of the display screen 1805, the processor 1801 controls an operable control on the UI according to a pressure operation of the user on the display screen 1805. The operable control includes at least one of a button control, a scroll bar control, an icon control, and a menu control.

The fingerprint sensor 1814 is configured to capture the user's fingerprint. The processor 1801 identifies the user's identity based on the fingerprint captured by the fingerprint sensor 1814, or the fingerprint sensor 1814 identifies the user's identity according to the captured fingerprint.

The optical sensor 1815 is configured to capture light intensity of the environment. In an embodiment, the processor 1801 may control the display brightness of the display screen 1805 according to the light intensity of the environment captured by the optical sensor 1815.

The proximity sensor 1816, also called a distance sensor, is usually provided at the front panel of the terminal 1800. The proximity sensor 1816 is configured to capture the distance between the user and the front surface of the terminal 1800.

It should be understood by those skilled in the art that the structure shown in FIG. 18 does not constitute a limitation to the terminal 1800, and may include more or less components than those illustrated, or combine some components or adopt different component arrangements.

Figure 19:
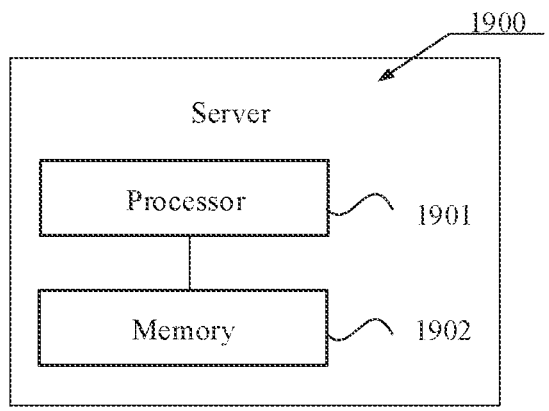
FIG. 19 is a structural block diagram of a server according to some embodiments of the present disclosure.

FIG. 19 is a structural block diagram of a server according to some embodiments of the present disclosure. Significant differences may be generated in the case that the server 1900 has different configurations or performances. The server 1900 may include one or more processors (CPU) 1901 and one or more memories 1902 stored with at least one piece of program code. The at least one piece of program code, when loaded and executed by the one or more processors 1901, causes the one or more processors 1901 to implement the method for establishing co-hosting in live-streaming as performed by the server according to the foregoing method embodiments. The server 1900 may further include components such as a wired or wireless network interface, a keyboard, and an input/output interface for input and output, and the server 1900 may further include other components for creating device functions, which is not repeated here.

In some embodiments, a computer-readable storage medium including the program code is provided, such as a memory 1902 including the program code. The program code can be executed by the processor 1901 of the server 1900 to perform the method for establishing co-hosting in live-streaming. Optionally, the computer-readable storage medium may be a read-only memory (ROM), a random-access memory (RAM), a compact disc ROM (CD-ROM), a magnetic tape, a floppy disc, an optical data storage device or the like.

In some embodiments, a computer program product including a computer program is provided. The computer program, when run by a processor, causes the processor to perform the method for establishing co-hosting in live-streaming described above.

In some embodiments, the computer programs involved in embodiments of the present disclosure may be deployed for execution on a single computer device, or on a plurality of computer devices disposed at a single location, or on a plurality of computer devices distributed over a plurality of locations and interconnected via a communication network. The plurality of computer devices distributed over a plurality of locations and interconnected via a communication network may form a blockchain system.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for establishing co-hosting in live-streaming, performed by a terminal corresponding to a first user account in a live-streaming room, the first user account being a live streamer account, the method comprising:

displaying a co-host mode setting portal in the live-streaming room of the first user account in response to a trigger operation on a target co-host site, wherein the target co-host site is a co-host site in a co-host state;

displaying a first co-host mode, a second co-host mode, and a third co-host mode in response to a trigger operation on the co-host mode setting portal, wherein the first user account initiates a co-host invitation to the live-streaming room in the first co-host mode, at least one second user account autonomously establishes co-hosting in the second co-host mode, the second user account requests co-hosting in the live-streaming room in the third co-host mode, and the second user account is a viewer account in the live-streaming room;

determining a selected co-host mode as a target co-host mode for the live-streaming room in response to a select operation on any one of the first co-host mode, the second co-host mode, and the third co-host mode;

sending a first co-host request to a server in response to the co-host invitation initiated by the first user account to any one of the at least one second user account in the live-streaming room in a case of the target co-host mode being determined as the first co-host mode, wherein the first co-host request is configured to request co-hosting with the second user account corresponding to the co-host invitation;

receiving, in response to any one of the at least one second user account in the live-streaming room initiating a second co-host request and a co-host vacant site existing in the live-streaming room, live-streaming data of the second user account corresponding to the second co-host request in the live-streaming room in a case of the target co-host mode being determined as the second co-host mode, wherein the second co-host request is configured to acquire a co-host vacant site which is a co-host site in an idle state; and receiving a third co-host request from any one of the at least one second user account, wherein the third co-host request is configured to request co-hosting with the first user account in a case of the target co-host mode being determined as the third co-host mode; and receiving live-streaming data of the second user account corresponding to the third co-host request in response to an accept operation to the third co-host request of the second user account.

2. The method according to claim 1, wherein said displaying the first co-host mode, the second co-host mode, and the third co-host mode in response to the trigger operation on the co-host mode setting portal comprises:
displaying a co-host mode setting panel in response to the trigger operation on the co-host mode setting portal; and
displaying the first co-host mode, the second co-host mode, and the third co-host mode in the co-host mode setting panel.

3. The method according to claim 1, further comprising:
displaying a co-host control in the live-streaming room as an inoperable state in a case of the target co-host mode being determined as the first co-host mode, wherein the second user account establishes co-hosting by the co-host control.

4. The method according to claim 1, further comprising:
displaying a plurality of second user accounts not in a co-host state in the live-streaming room in response to a trigger operation on a co-host management portal in the live-streaming room.

5. The method according to claim 1, further comprising:
receiving live-streaming data of the second user account in response to the second user account accepting the first co-host request.

6. The method according to claim 1, further comprising:
displaying a co-host prompt message in the live-streaming room in response to the second user account rejecting or failing to respond to the first co-host request, wherein the co-host prompt message is configured to prompt the first user account that the second user account rejects or fails to respond to the first co-host request.

7. The method according to claim 1, wherein the live-streaming room comprises a plurality of co-host sites; and said displaying the co-host mode setting portal in the live-streaming room of the first user account comprises:
displaying a first co-host management panel in response to a trigger operation on a target co-host site, wherein the first co-host management panel is configured to manage a co-host permission of an account corresponding to the target co-host site, and the target co-host site corresponds to any one of the at least one second user account in a co-host state in the live-streaming room; and
displaying the co-host mode setting portal in the first co-host management panel.

8. The method according to claim 7, further comprising:
setting the target co-host site to a muted state in response to a trigger operation on a mute control in the first co-host management panel; or
revoking the co-host permission of the account corresponding to the target co-host site in response to a trigger operation on a dismiss control in the first co-host management panel.

9. The method according to claim 1, wherein the live-streaming room comprises a live-streaming room setting portal; and said displaying the co-host mode setting portal in the live-streaming room of the first user account comprises:
displaying a live-streaming room setting panel in response to a trigger operation on the live-streaming room setting portal, wherein the live-streaming room setting panel is configured to set information associated with the live-streaming room; and
displaying the co-host mode setting portal in the live-streaming room setting panel.

10. The method according to claim 1, wherein the live-streaming room comprises a co-host management portal, said displaying the co-host mode setting portal in the live-streaming room of the first user account comprises:
displaying a second co-host management panel in response to a trigger operation on the co-host management portal, wherein the second co-host management panel is configured to display co-host states of the second user accounts in the live-streaming room; and
displaying the co-host mode setting portal in the second co-host management panel.

11. The method according to claim 1, further comprising:
displaying a number of accounts that have submitted a co-host request at a present moment in a region where a co-host management portal of the live-streaming room is configured.

12. The method according to claim 11, further comprising:
displaying a plurality of co-host request messages in the live-streaming room in response to a trigger operation on the co-host management portal, wherein the co-host request message indicates that the second user account requests co-hosting with the first user account.

13. The method according to claim 1, wherein the second co-host request and the third co-host request are initiated in response to a trigger operation on the co-host vacant site, the second user account is an account having a co-host permission, the co-host permission is granted by the first user account to the second user account based on characteristics information of the second user account by an option for setting the co-host permission, and the account having the co-host permission comprises at least one of an account belonging to a same region as the first user account, an account belonging to a target region, an account whose attribute information meets a target condition, an account that already follows the first user account, an account that follows each other with the first user account, or an account that the first user account already follows.

14. A terminal, comprising:
one or more processors; and
a memory configured to store one or more program codes executable by the one or more processors;
wherein the one or more processors, when running the one or more program codes, are caused to execute instructions for:
displaying a co-host mode setting portal in a live-streaming room of a first user account in response to a trigger operation on a target co-host site, wherein the target co-host site is a co-host site in a co-host state;
displaying a first co-host mode, a second co-host mode, and a third co-host mode in response to a trigger operation on the co-host mode setting portal, wherein the first user account initiates a co-host invitation to the live-streaming room in the first co-host mode, at least one second user account autonomously establishes co-hosting in the second co-host mode, the second user account requests co-hosting in the live-streaming room in the third co-host mode, and the second user account is a viewer account in the live-streaming room;
determining a selected co-host mode as a target co-host mode for the live-streaming room in response to a select operation on any one of the first co-host mode, the second co-host mode, and the third co-host mode;
sending a first co-host request to a server in response to the co-host invitation initiated by the first user account to any one of the at least one second user account in the live-streaming room in a case of the target co-host mode being determined as the first co-host mode, wherein the first co-host request is configured to request co-hosting with the second user account corresponding to the co-host invitation;

receiving, in response to any one of the at least one second user account in the live-streaming room initiating a second co-host request and a co-host vacant site existing in the live-streaming room, live-streaming data of the second user account corresponding to the second co-host request in the live-streaming room in a case of the target co-host mode being determined as the second co-host mode, wherein the second co-host request is configured to acquire a co-host vacant site which is a co-host site in an idle state; and receiving a third co-host request from any one of the at least one second user account, wherein the third co-host request is configured to request co-hosting with the first user account in a case of the target co-host mode being determined as the third co-host mode; and receiving live-streaming data of the second user account corresponding to the third co-host request in response to an accept operation to the third co-host request of the second user account.

15. The terminal according to claim 14, wherein the one or more processors, when running the one or more program codes, are further caused to execute instructions for:

displaying a co-host mode setting panel in response to the trigger operation on the co-host mode setting portal; and displaying the first co-host mode, the second co-host mode, and the third co-host mode in the co-host mode setting panel.

16. The terminal according to claim 14, wherein the one or more processors, when running the one or more program codes, are further caused to execute an instruction for:

displaying a co-host control in the live-streaming room as an inoperable state in a case of the target co-host mode being determined as the first co-host mode, wherein the second user account establishes co-hosting by the co-host control.

17. The terminal according to claim 14, wherein the second co-host request and the third co-host request are initiated in response to a trigger operation on the co-host vacant site, the second user account is an account having a co-host permission, the co-host permission is granted by the first user account to the second user account based on characteristics information of the second user account by an option for setting the co-host permission, and the account having the co-host permission comprises at least one of an account belonging to a same region as the first user account, an account belonging to a target region, an account whose attribute information meets a target condition, an account that already follows the first user account, an account that follows each other with the first user account, or an account that the first user account already follows.

18. A non-transitory computer-readable storage medium storing one or more program codes therein, wherein the one or more program codes, when run by a processor of a terminal, cause the terminal to execute instructions for:

displaying a co-host mode setting portal in a live-streaming room of a first user account in response to a trigger operation on a target co-host site, wherein the target co-host site is a co-host site in a co-host state;

displaying a first co-host mode, a second co-host mode, and a third co-host mode in response to a trigger operation on the co-host mode setting portal, wherein the first user account initiates a co-host invitation to the live-streaming room in the first co-host mode, at least one second user account autonomously establishes co-hosting in the second co-host mode, the second user account requests co-hosting in the live-streaming room in the third co-host mode, and the second user account is a viewer account in the live-streaming room;

determining a selected co-host mode as a target co-host mode for the live-streaming room in response to a select operation on any one of the first co-host mode, the second co-host mode, and the third co-host mode;

sending a first co-host request to a server in response to the co-host invitation initiated by the first user account to any one of the at least one second user account in the live-streaming room in a case of the target co-host mode being determined as the first co-host mode, wherein the first co-host request is configured to request co-hosting with the second user account corresponding to the co-host invitation;

receiving, in response to any one of the at least one second user account in the live-streaming room initiating a second co-host request and a co-host vacant site existing in the live-streaming room, live-streaming data of the second user account corresponding to the second co-host request in the live-streaming room in a case of the target co-host mode being determined as the second co-host mode, wherein the second co-host request is configured to acquire a co-host vacant site which is a co-host site in an idle state; and receiving a third co-host request from any one of the at least one second user account, wherein the third co-host request is configured to request co-hosting with the first user account in a case of the target co-host mode being determined as the third co-host mode; and receiving live-streaming data of the second user account corresponding to the third co-host request in response to an accept operation to the third co-host request of the second user account.

19. The non-transitory computer-readable storage medium according to claim 18, wherein the second co-host request and the third co-host request are initiated in response to a trigger operation on the co-host vacant site, the second user account is an account having a co-host permission, the co-host permission is granted by the first user account to the second user account based on characteristics information of the second user account by an option for setting the co-host permission, and the account having the co-host permission comprises at least one of an account belonging to a same region as the first user account, an account belonging to a target region, an account whose attribute information meets a target condition, an account that already follows the first user account, an account that follows each other with the first user account, or an account that the first user account already follows.

* * * * *